US011159739B2

(12) United States Patent
Kim et al.

(10) Patent No.: US 11,159,739 B2
(45) Date of Patent: Oct. 26, 2021

(54) APPARATUS AND METHOD FOR GENERATING MOVING IMAGE DATA INCLUDING MULTIPLE SECTION IMAGES IN ELECTRONIC DEVICE

(71) Applicant: SAMSUNG ELECTRONICS CO., LTD., Suwon-si (KR)

(72) Inventors: Dongsoo Kim, Suwon-si (KR); Shuichi Shimokawa, Suwon-si (KR); Kawang Kang, Suwon-si (KR); Hwayong Kang, Suwon-si (KR); Yeongeun Kim, Suwon-si (KR); Yeotak Youn, Suwon-si (KR); Youngkwon Yoon, Suwon-si (KR); Changbae Lee, Suwon-si (KR); Jonghoon Won, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 16/534,081

(22) Filed: Aug. 7, 2019

(65) Prior Publication Data

US 2020/0053273 A1 Feb. 13, 2020

(30) Foreign Application Priority Data

Aug. 7, 2018 (KR) .................. 10-2018-0091795

(51) Int. Cl.
 *H04N 5/235* (2006.01)
(52) U.S. Cl.
 CPC ......... *H04N 5/2357* (2013.01); *H04N 5/2354* (2013.01)
(58) Field of Classification Search
 CPC ............... H04N 5/2357; H04N 5/2354; H04N 5/23232; H04N 5/23218; H04N 5/23229
 See application file for complete search history.

(56) References Cited

U.S. PATENT DOCUMENTS

2007/0189728 A1\* 8/2007 Yu ...................... H04N 5/23218
 386/226
2010/0053345 A1 3/2010 Kim et al.
 (Continued)

FOREIGN PATENT DOCUMENTS

JP 2008-085860 4/2008
WO 2017/217137 12/2017
 (Continued)

OTHER PUBLICATIONS

Extended Search Report dated Dec. 5, 2019 in counterpart European Patent Application No. EP19190569.4.
 (Continued)

*Primary Examiner* — Hung H Lam
(74) *Attorney, Agent, or Firm* — Nixon & Vanderhye P.C.

(57) ABSTRACT

According to various embodiments, an electronic device includes an image sensor, a memory, and a processor. The processor is configured to control the electronic device to: obtain a plurality of image frames including external light and an external object at a first designated frame rate using the image sensor, based on a capturing signal; identify a frequency of a flicker related to the external light source; generate first section images for at least a part of a time for which the plurality of image frames are obtained using frames selected from the plurality of image frames corresponding to a second designated frame rate based at least on the frequency, the second designated frame rate being lower than the first designated frame rate; generate second section images for at least a part of the time for which the plurality of image frames are obtained in response at least to a designated input using image frames obtained at the first designated frame rate after the designated input from among the plurality of image frames; and generate moving image (Continued)

data including at least the first section images and the second section images.

20 Claims, 16 Drawing Sheets

(56) References Cited

U.S. PATENT DOCUMENTS

| | | | | |
|---|---|---|---|---|
| 2017/0026580 A1* | 1/2017 | Gyotoku | ............ | H04N 5/23287 |
| 2017/0359549 A1* | 12/2017 | Baran | .................. | H04N 5/3532 |
| 2018/0225941 A1 | 8/2018 | Kim et al. | | |
| 2019/0215434 A1* | 7/2019 | Suzuki | .................. | H04N 5/353 |
| 2019/0268525 A1* | 8/2019 | Okada | ................ | H04N 5/23293 |

FOREIGN PATENT DOCUMENTS

| | | |
|---|---|---|
| WO | 2018/079390 | 5/2018 |
| WO | 2018/143696 | 8/2018 |

OTHER PUBLICATIONS

European Examination Report dated Jun. 29, 2021 for EP Application No. 19190569.4.

\* cited by examiner ical devices (for example, mobile terminals, smartphones, wearable devices, digital cameras, or the like) may
APPARATUS AND METHOD FOR GENERATING MOVING IMAGE DATA INCLUDING MULTIPLE SECTION IMAGES IN ELECTRONIC DEVICE

CROSS-REFERENCE TO RELATED APPLICATION

This application is based on and claims priority under 35 U.S.C. § 119 to Korean Patent Application No. 10-2018-0091795, filed on Aug. 7, 2018, in the Korean Intellectual Property Office, the disclosure of which is incorporated by reference herein in its entirety.

BACKGROUND

Field

The disclosure relates to an apparatus and a method for processing an image, which can remove and/or reduce a flicker caused by an external light source in an electronic device.

Description of Related Art

Electronic devices (for example, mobile terminals, smartphones, wearable devices, digital cameras, or the like) may provide various functions. For example, a smartphone may provide a short-range wireless communication (for example, Bluetooth, Wi-Fi, near field communication (NFC), or the like) function, a mobile communication ($3^{rd}$ generation (3G), 4G, 5G, or the like) function, a music or a moving image replay function, a photo or moving image capturing function, or a navigation function, in addition to a basic voice communication function.

Electronic devices may include image sensors. For example, an electronic device may include an image sensor which can capture at a speed several times to several tens of times higher than normal capturing. An image obtained at the electronic device may be influenced by an illumination environment. For example, a lighting device such as a fluorescent lamp may perform an illuminating operation using alternating current (AC) power of 50 Hz. When an image is obtained while a lighting device is driven, the image may include a flicker which is based on an AC power frequency of the lighting device.

The above information is presented as background information only to assist with an understanding of the disclosure. No determination has been made, and no assertion is made, as to whether any of the above might be applicable as prior art with regard to the disclosure.

An electronic device may include a slow motion function which obtains an image at a fast rate and plays back the image at a slow rate when obtaining an image including a moving object. The electronic device provided with the slow motion function may identify a motion of an object in the middle of capturing the object, and may generate a moving image using images obtained at a fast frame rate or a normal frame rate using an image sensor, based on the motion, and may store the moving image. When a moving image is stored in an environment using an artificial lighting device, a flicker may be included in a moving image of a fast frame rate, and a flicker may be included even in a moving image of a normal frame rate.

SUMMARY

The disclosure provides an apparatus and a method for generating an image in an electronic device, which can remove and/or reduce a flicker included in a moving image when recording a moving image, such as, for example, a slow motion moving image.

The disclosure provides an apparatus and a method which obtain a plurality of image frames (or frame images) including external light and an external object at a first frame rate, and, for at least a part of a time for which the plurality of image frames are obtained, generate a section image using some frames selected from the plurality of image frames to correspond to a second designated frame rate, which is lower than the first frame rate, based on a flicker frequency.

The disclosure provides an apparatus and a method which obtain fast frame images through an image sensor in an electronic device, select a plurality of frame images based on a flicker frequency, and generate a section image with a frame image having a highest luminance from among the selected plurality of frame images.

The disclosure provides an apparatus and a method which obtain fast frame images through an image sensor in an electronic device, select a plurality of frame images based on a flicker frequency, and generate a section image based on an average value of luminance of the selected plurality of frame images.

According to various embodiments, an electronic device includes an image sensor, a memory, and a processor. The processor may be configured to control the electronic device to: obtain a plurality of image frames including external light generated from an external light source and an external object at a first designated frame rate using the image sensor based on a capturing signal; identify a frequency of a flicker related to the external light source; generate first section images for at least a part of a time for which the plurality of image frames are obtained using frames selected from the plurality of image frames corresponding to a second designated frame rate based at least on the frequency, the second designated frame rate being lower than the first designated frame rate; generate second section images for at least a part of the time for which the plurality of image frames are obtained, in response at least to a designated input using image frames obtained at the first designated frame rate after the designated input from among the plurality of image frames; and generate moving image data including at least the first section images and the second section images.

According to various embodiments, a method for generating a moving image of an electronic device includes: obtaining a plurality of image frames including external light generated from an external light source and an external object at a first designated frame rate using an image sensor, based on a capturing signal; identifying a frequency of a flicker related to the external light source; generating first section images for at least a part of a time for which the plurality of image frames are obtained using some frames selected from the plurality of image frames corresponding to a second designated frame rate based at least on the frequency, the second designated frame rate being lower than the first designated frame rate; and generating second section images for at least a part of the time for which the plurality of image frames are obtained, in response at least to a designated input using image frames obtained at the first designated frame rate after the designated input from among the plurality of image frames.

According to various embodiments, an electronic device includes: an image sensor configured to obtain a plurality of image frames including external light generated from an external light source and an external object at a first designated frame rate, based on a capturing signal; a processor configured to store a generated moving image; and an image signal processor. The image signal processor may be configured to: receive the plurality of image frames from the image sensor; identify a frequency of a flicker related to the external light source; generate first section images for at least a part of a time for which the plurality of image frames are obtained in the image sensor using frames selected from the plurality of image frames corresponding to a second designated frame rate based at least on the flicker frequency, the second designated frame rate being lower than the first designated frame rate; generate second section images for at least a part of the time for which the plurality of image frames are obtained in the image sensor, in response at least to a designated input using image frames obtained at the first designated frame rate after the designated input from among the plurality of image frames; and transmit moving image data including at least the first section images and the second section images to the processor.

According to various embodiments, an electronic device includes an image sensor, a memory, and a processor. The processor may be configured to control the electronic device to: obtain a plurality of image frames including external light generated from an external light source and an external object at a first designated frame rate using the image sensor, based on a capturing signal; identify a frequency of a flicker related to the external light source; generate first section images for at least a part of a time for which the plurality of image frames are obtained using frames selected from the plurality of image frames corresponding to a second designated frame rate based on the frequency, the second designated frame rate being lower than the first designated frame rate; generate the first section images based on a designated input not occurring while the plurality of image frames are obtained, using some frames selected to correspond to the second designated frame rate; and generate second section images having the first designated frame rate based on the designated input occurring for at least a part of the time for which the plurality of image frames are obtained using image frames which are obtained after the designated input from among the plurality of image frames.

According to various embodiments, an electronic device includes an image sensor, a memory, and a processor. The processor may be configured to control the electronic device to: obtain a plurality of image frames including external light generated from an external light source and an external object, at a first designated frame rate using the image sensor, based on a capturing signal; identify a frequency of a flicker related to the external light source and a designated input; generate first section images for at least a part of a time for which the plurality of image frames are obtained using frames selected from a plurality of image frames obtained before the designated input from among the plurality of image frames corresponding to a second designated frame rate based at least on the flicker frequency, the second designated frame rate being lower than the first designated frame rate; generate second section images for at least a part of the time for which the plurality of image frames are obtained using a plurality of image frames obtained after the designated input from among the plurality of image frames; and generate moving image data including at least the first section images and the second section images.

BRIEF DESCRIPTION OF THE DRAWINGS

The above and other aspects, features, and advantages of certain embodiments of the disclosure will be more apparent from the following detailed description, taken in conjunction with the accompanying drawings, in which.

DETAILED DESCRIPTION

Hereinafter, various example embodiments will be described with reference to the accompanying drawings.

Figure 1:
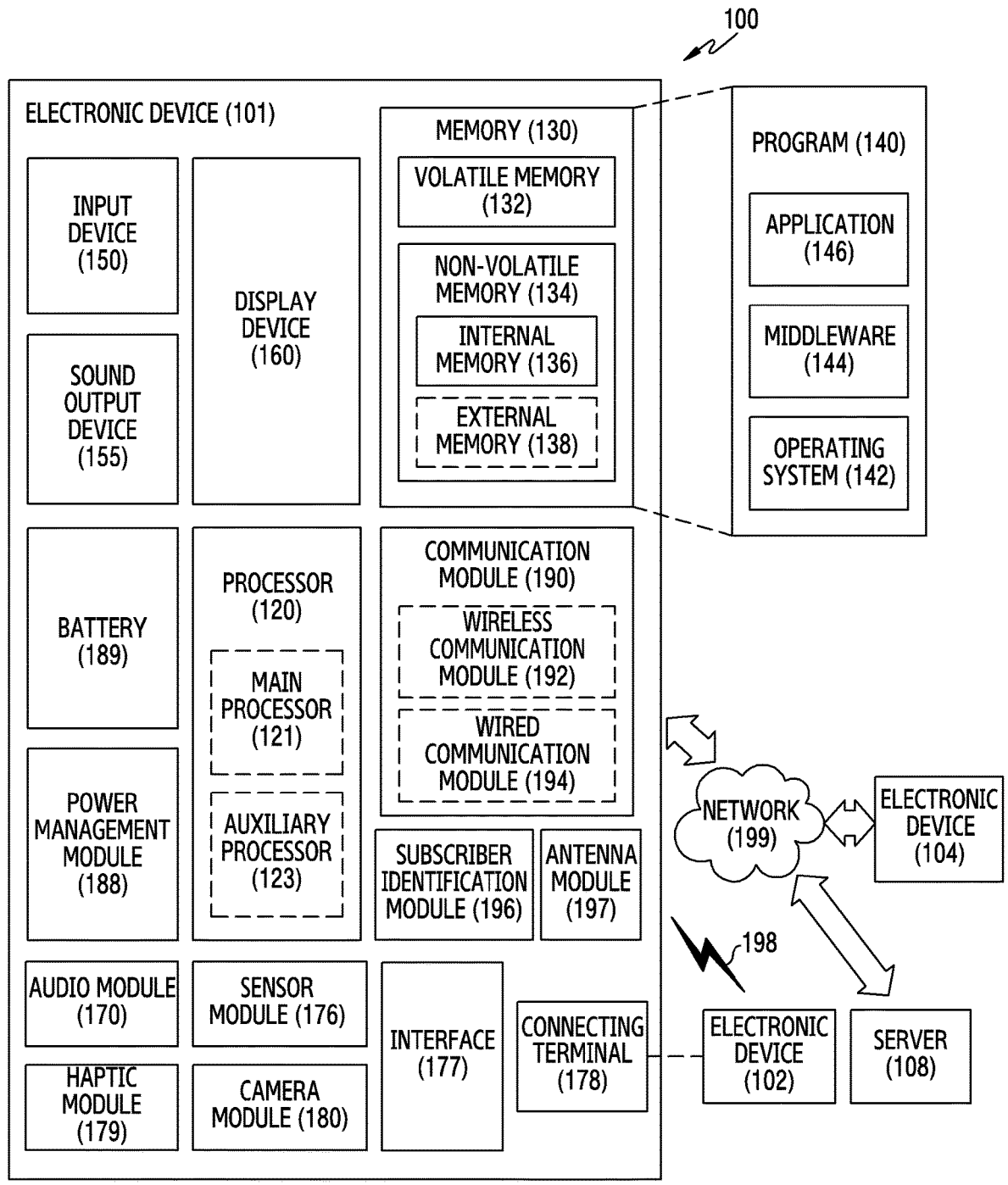
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
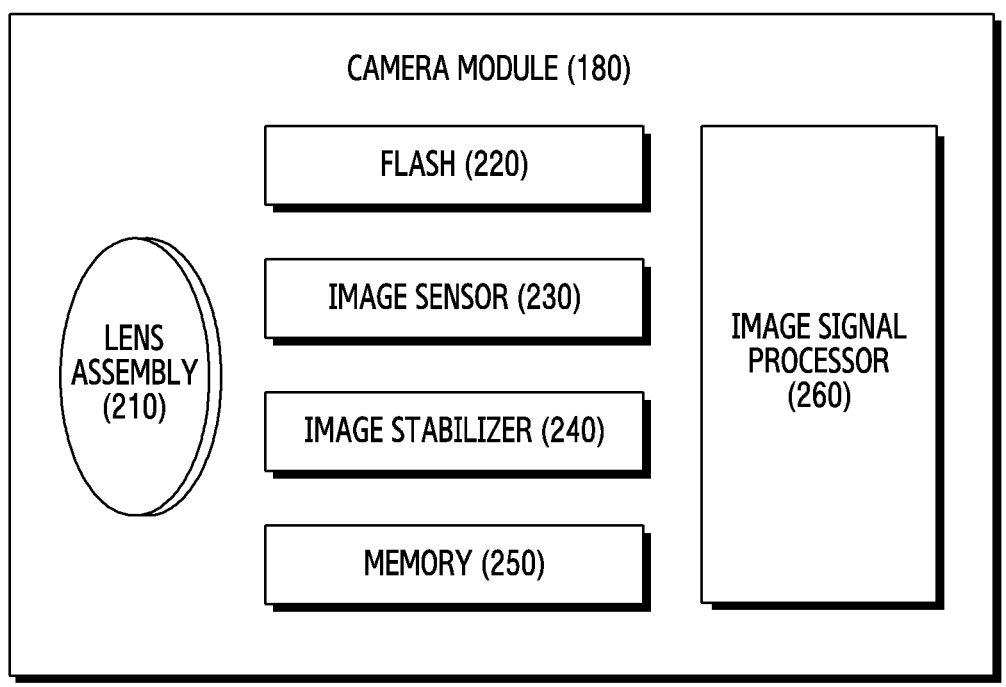
FIG. 2 is a block diagram illustrating an example of a camera module according to various embodiments.

FIG. 2 is a block diagram 200 illustrating an example of the camera module 180 according to various embodiments. Referring to FIG. 2, the camera module 180 may include a lens assembly (e.g., including at least one lens) 210, a flash 220, an image sensor 230, an image stabilizer (e.g., including image stabilizing circuitry) 240, memory 250 (e.g., buffer memory), and/or an image signal processor (e.g., including processing circuitry) 260.

The lens assembly 210 may collect light emitted and/or reflected from an object whose image is to be taken. The lens assembly 210 may include one or more lenses. According to an embodiment, the camera module 180 may include a plurality of lens assemblies 210. In such a case, the camera module 180 may be, for example, and without limitation, a dual camera, a 360-degree camera, a spherical camera, or the like. Some of the plurality of lens assemblies 210 may have the same lens attribute (e.g., view angle, focal length, auto-focusing, f number, optical zoom, etc.), and/or at least one lens assembly may have one or more lens attributes different from those of another lens assembly. The lens assembly 210 may include, for example, and without limitation, a wide-angle lens, a telephoto lens, or the like.

The flash 220 may, for example, emit light that is used to reinforce light reflected from an object. According to an embodiment, the flash 220 may include one or more light emitting diodes (LEDs) (e.g., a red-green-blue (RGB) LED, a white LED, an infrared (IR) LED, an ultraviolet (UV) LED, etc.), a xenon lamp, or the like.

The image sensor 230 may obtain an image corresponding to an object by converting light emitted and/or reflected from the object and transmitted via the lens assembly 210 into an electrical signal. According to an embodiment, the image sensor 230 may include one selected from image sensors having different attributes, such as, for example, and without limitation, a RGB sensor, a black-and-white (BW) sensor, an IR sensor, a UV sensor, or the like, a plurality of image sensors having the same attribute, and/or a plurality of image sensors having different attributes. Each image sensor included in the image sensor 230 may be implemented using, for example, and without limitation, a charged coupled device (CCD) sensor, a complementary metal oxide semiconductor (CMOS) sensor, or the like.

The image stabilizer 240 may include various image stabilizing circuitry and move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using, for example, and without limitation, a gyro sensor (not shown), an acceleration sensor (not shown), or the like, disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may include various image processing circuitry and perform one or more image processing functions with respect to an image obtained via the image sensor 230 or an image stored in the memory 250. The one or more image processing functions may include, for example, and without limitation, depth map generation, three-dimensional (3D) modeling, panorama generation, feature point extraction, image synthesizing, image compensation (e.g., noise reduction, resolution adjustment, brightness adjustment, blurring, sharpening, softening, etc.), or the like. The image signal processor 260 may perform control (e.g., exposure time control, read-out timing control, etc.) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may, for example, be a wide-angle camera and at least another of the plurality of camera modules 180 may, for example, be a telephoto camera. Similarly, at least one of the plurality of camera modules 180 may, for example, be a front camera and at least another of the plurality of camera modules 180 may, for example, be a rear camera.

According to an embodiment, the electronic device 101 may not include the memory 250 and the image signal processor 250 in the camera module 180. For example, in the electronic device 101, the memory 250 and the image signal processor 260 may be configured independently in the electronic device 101 or may be configured in the processor 120.

The electronic device according to various embodiments may be one of various types of electronic devices. The electronic devices may include, for example, and without limitation, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, firmware, or any combinations thereof and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3A:
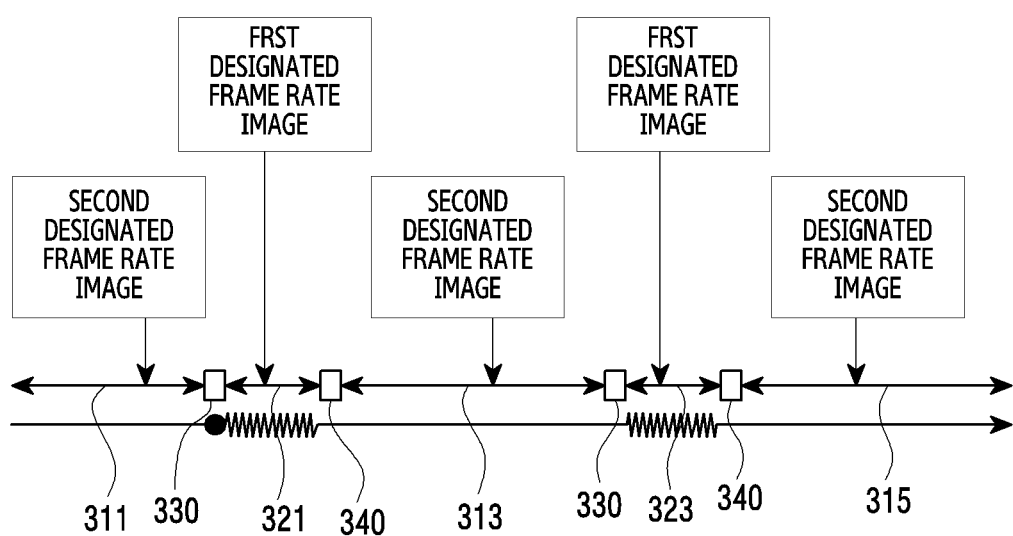
FIG. 3A is a diagram illustrating an example moving image recording operation of an electronic device according to various embodiments.
Figure 3B:
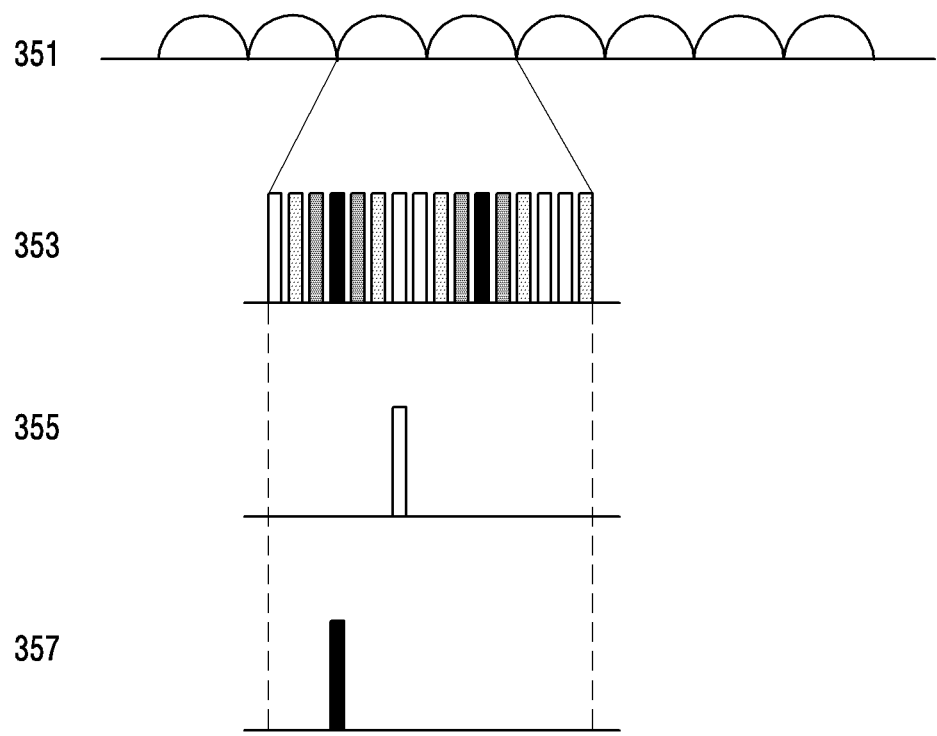
FIG. 3B is a diagram illustrating an example moving image recording operation of the electronic device according to various embodiments.

FIG. 3A is a diagram illustrating an example moving image recording operation of an electronic device according to various embodiments, and FIG. 3B is a diagram illustrating an example moving image recording operation of the electronic device according to various embodiments.

The electronic device (for example, the electronic device 101 of FIG. 1) may, for example, control a slow moving image recording operation. To display a moving image in a super slow motion (SSM), the electronic device may obtain images at a fast rate when recording a moving image, and may store the images obtained at the fast rate at normal speed. Based on this, the electronic device may play back the images as an image having a slow motion effect. For example, to perform a slow motion operation, the electronic device may obtain images at 90 frames per second (fps) and may store the images at 60 fps.

In various embodiments, to perform the slow motion function, a camera module (for example, the camera module 180 of FIG. 1 and FIG. 2) may obtain an image including an external object at a first designated frame rate. For example, an exposure time of an image sensor (for example, the image sensor 230 of FIG. 2) may be set to a time for which images can be obtained at the first designated frame rate. A processor (for example, the processor 120 of FIG. 1) of the electronic device may generate first section images or second section images.

In various embodiments, the processor 120 may identify a frequency of a flicker related to an external light source in a section in which a designated input has not occurred, and for at least a part of a time for which a plurality of image frames are obtained in the image sensor 230, the processor 120 may generate the first section images using some frames selected from the plurality of image frames to correspond to a second designated frame rate, which is lower than the first designated frame rate, based at least on the flicker frequency.

In various embodiments, for at least a part of the time for which the image sensor 230 obtains the plurality of image frames, in response at least to a designated input, the processor 120 may generate the second section images using image frames obtained after the designated input among the plurality of image frames, In various embodiments, the processor 120 may store the first section images and the second section images at the second designated frame rate.

In various embodiments, the first designated frame rate and a fast frame rate may refer, for example, to a rate at which the image sensor 230 obtains image frames. For example, the first designated frame rate may be 960 fps. The second designated frame rate and a normal frame rate may refer to a rate at which the processor 120 stores the first designated frame rate images obtained by the image sensor 230. For example, the second designated frame rate may be 30 fps and/or 60 fps. Referring to FIG. 3A, in a time section 311 of FIG. 3A, the electronic device may generate the first section images (for example, images of 30 fps and/or 60 fps) having the second designated frame rate, with the images obtained at the first designated frame rate. The electronic device may store the generated first section images at the second designated frame rate (for example, 60 fps or 30 fps). For example, the electronic device may store the first section images generated at 60 fps as images of 60 fps (or 30 fps).

When a designated input is recognized at a time 330 of FIG. 3A while the first section images having the second designated frame rate are being stored, the electronic device may generate the second section images (for example, images of 960 fps) having the first designated frame rate, obtained at the camera module, for a time 321 of FIG. 3A. For example, the designated input may be a user input for requesting recording of a moving image and/or detection of an event (for example, detection of a motion of an object in an image or detection of a change in a sound) during the recording of the first section images. The electronic device may store the generated second section images (images obtained at the first designated frame rate (for example, 960 fps)) at the second designated frame rate (for example, 60 fps or 30 fps). For example, when the electronic device generates the second section images by obtaining 960 fps images through the image sensor, the electronic device may store the 960 frame images as 60 frame (or 30 frame) images per second. For example, 16 seconds may be required to store the 960 frame images.

When the designated input is disabled at a time 340 of FIG. 3A while the second section images of the first designated frame rate are being generated, the electronic device may generate and store the first section images having the second designated frame rate, with images obtained at the first designated frame rate in a time section 313 of FIG. 3A. For example, disabling of the designated input may be a user's input of disabling the recording, or may correspond to a case in which a motion of the electronic device is detected while the second section images are being generated, a case in which a designated time for which the second section images are generated elapses, and/or a case in which the number of second section images exceeds a designated image frame number.

According to various embodiments, when the electronic device generates a moving image for the slow motion function, the electronic device may generate the second section images using image frames having the first designated frame rate, obtained in the image sensor, in response to the designated input, and, when the designated input is disabled, may generate the first section images by selecting some of the images obtained at the first designated frame rate in the image sensor. In various embodiments, the first designated frame rate (for example, 960 fps) may be a frame rate related to frames that are transmitted to the processor when images are obtained and the second section images are generated. The second designated frame rate (for example, 30 fps or 60 fps) may be a frame rate related to frames transmitted to the processor when the first section images are generated, or related to a recording rate.

In various embodiments, the processor may store the first section images and the second section images at the same frame rate. The electronic device may not apply a different storing frame rate (recording frame rate) according to a section, and may store the first section images and the second section images at the same storing rate (second designated frame rate). Since the numbers of images used for recording in the first section and the second section are different (the number of images generated in the second section is larger than in the first section), an object appearing in the image may be displayed as moving slowly when the images stored in the second section are played back. For example, in an operation of recording the first section images, the image sensor may obtain 960 images per second. The processor may select 60 frame images per second from the 960 frame images per second, which are obtained in the image sensor, (select one frame image from 16 frame images to correspond to 60 fps). The processor may record (generate a moving image) at 60 fps using the 60 frame images per second obtained. When recording a moving image of 30 fps, the processor may select one frame image from two frame images and may record. For example, in an operation of recording the second section images, the image sensor may obtain 960 frame images per second, and the processor may divide the 960 frame images per second obtained in the image sensor into 60 frame images per second, and may store the divided frame images. For example, the processor may generate a 16-second image using the images obtained in the image sensor for 1 second, and may store the image. Accordingly, since the images captured for 1 second are recorded for 16 seconds in the second section, there may be an effect that the image is placed back in a super slow motion. When recording the second section images, the processor may store all or a part of the 960 frame images per second obtained in the image sensor. For example, the processor may select 120 frame images from the 960 frame images and may store the 120 frame images as 60 frame images per second.

According to various embodiments, the first section images and the second section images may be generated in the image sensor. The image sensor may obtain images at the first designated frame rate, may select some of the images obtained at the first designated frame rate when generating the first section images and may generate the first section images having the second designated frame rate, and may transmit the generated first section images to the processor.

According to various embodiments, the first section images and the second section images may be generated in the image signal processor. The image sensor may obtain images at the first designated frame rate and may transmit the images to the image signal processor. The image signal processor may select some of the images obtained in the image sensor at the first designated frame rate to generate the first section images, may generate the first section images having the second designated frame rate, and may transmit the generated first section images to the processor. The image signal processor may transmit first designated frame rate images obtained in the image sensor to the processor as they are when generating the second section images.

In the following description, an operation of recording (or storing) the second section images having the first designated frame rate, which are obtained in the image sensor, may be referred to as "fast frame rate recording," and an operation of recording the first section images having the second designated frame rate, which are selected based on a flicker frequency, may be referred to as "normal frame rate recording." When the electronic device records a moving image with a slow motion function, the electronic device may obtain the first designated frame rate images and may generate the second section images based on the designated input, as indicated by reference numerals 321, 323 of FIG. 3A, and, when there is a request for disabling the designated input at a time when the fast frame rate recording is performed (at a time when preview is converted to the fast frame rate recording) and while the fast frame rate recording is being performed, the electronic device may obtain the first designated frame rate images and may generate the first section images of the second designated frame rate, as indicated by reference numerals 311, 313, 315 of FIG. 3A. The first section (normal frame rate recording section) in the operation of generating the moving image may be a section in which the designated input is detected (for example, a user's recording command, detection of a motion of an object included in the image), and the second section (fast frame rate recording section) may be a section in which images including a motion of an object are generated at the first frame rate (for example, a fast frame rate) and are stored at the second frame rate (for example, a normal frame rate).

The electronic device including the camera module may obtain an image using light generated in an artificial illumination (or artificial lighting) device. The artificial illumination device may generate light using AC power. The artificial illumination device may, for example, be a fluorescent lamp, a light bulb, a halogen lamp, a light emitting diode (LED) lamp, or the like.

Referring to FIG. 3B, an artificial illumination device may be driven by AC power as indicated by reference numeral 351 of FIG. 3B, and may emit light. Reference numeral 351 of FIG. 3B may indicate an example of AC power represented as a ripple current. For example, a frequency of AC power may be 60 Hz. The image sensor may use exposure times which are multiples of a period (as called the frequency period) of the AC power to avoid a flicker caused by artificial illumination. The image sensor may obtain first designated frame rate images having the first designated frame rate in one period section of the AC power, as indicated by reference numeral 353 of FIG. 3B. For example, the image sensor may obtain 16 images in one period (corresponding to 60 Hz) section of the AC power. For example, when the AC power is 60 Hz, the first designated frame rate may be 960 fps (60 (Hz)*16=960). Reference numerals 355 and 357 of FIG. 3B may indicate a second section image of the second designated frame rate. The second designated frame rate may be 60 fps, and the second section image may be one 960 fps image transmitted in the 60 fps section.

Images generated in the first section and the second section of the electronic device may appear as shown in table 1 presented below:

TABLE 1

| Preview | First section | Second section |
|---|---|---|
| 60 fps (1/960 readout, stop for 15 frames, readout & output for 1 frame) | 960 fps internal operation during motion detection, 15 frames skip, 1 frame output for 60 fps (1/960 readout, readout and not output for 15 frames, readout & output for 1 frame) Motion Detection X 60 fps operation (1/960 readout, stop for 15 frames, readout & output for 1 frame) | 960 fps (1/960 readout, readout & output for 16 frame, compared with 60 fps) |
| 60 fps | Second designated frame rate 60 fps | First designated frame rate 960 fps |
| Display as a preview screen | Select or generate one frame image from 16 frame images of a flicker frequency period | Record images obtained at 960 fps at the second designated frame rate |

In the following description, the "first designated frame rate" may refer, for example, to a fast frame rate or 960 fps, and the "second designated frame rate" may refer, for example, to as a normal frame rate or 60 fps (or 30 fps). "Fast frame rate recording" may be used as a term including a super slow motion, and may be used as a term referring to an operation of recording a moving image having a fast frame rate based on a designated input. "Normal frame rate recording" may be used as a term referring to an operation of recording a moving image having a normal frame rate when the designated input is disabled. The "designated input" may be used as a term including a recording button input of a user requesting execution of recording, and detection of a motion of an object in an image while normal frame rate recording is performed. "Disabling of the designated input" may be used as a term including a user's input of disabling recording when fast frame rate recording is performed, and including a case in which a motion of the electronic device is detected while second section images are generated, a case in which a designated time for which second section images are generated elapses, and/or a case in which the number of second section images exceeds a designated image frame number.

In the images indicated by reference numeral 353 of FIG. 3B, a frame image indicated by reference numeral 355 and a frame image indicated by reference numeral 357 may have different luminance. For example, the second section image of the second designated frame rate indicated by reference numeral 355 of FIG. 3B, and the second section image of the second designated frame rate indicated by reference numeral 357 of FIG. 3B may be images having different luminance. When the images indicated by reference numerals 355 and 357 of FIG. 3B are generated, a flicker may occur. As shown in table 1, in the first section, the electronic device may generate the first section image by selecting one image from images transmitted at 960 fps (for example, sixteen (16) 960 fps images transmitted in a flicker frequency period (first section, for example, 60 Hz)). The processor may know the flicker frequency, and, when generating the first section image, the processor may select a frame image having designated luminance (for example, maximum luminance) within the flicker frequency period as the first section image, as indicated by reference numeral 355 of FIG. 3B.

Figure 4:
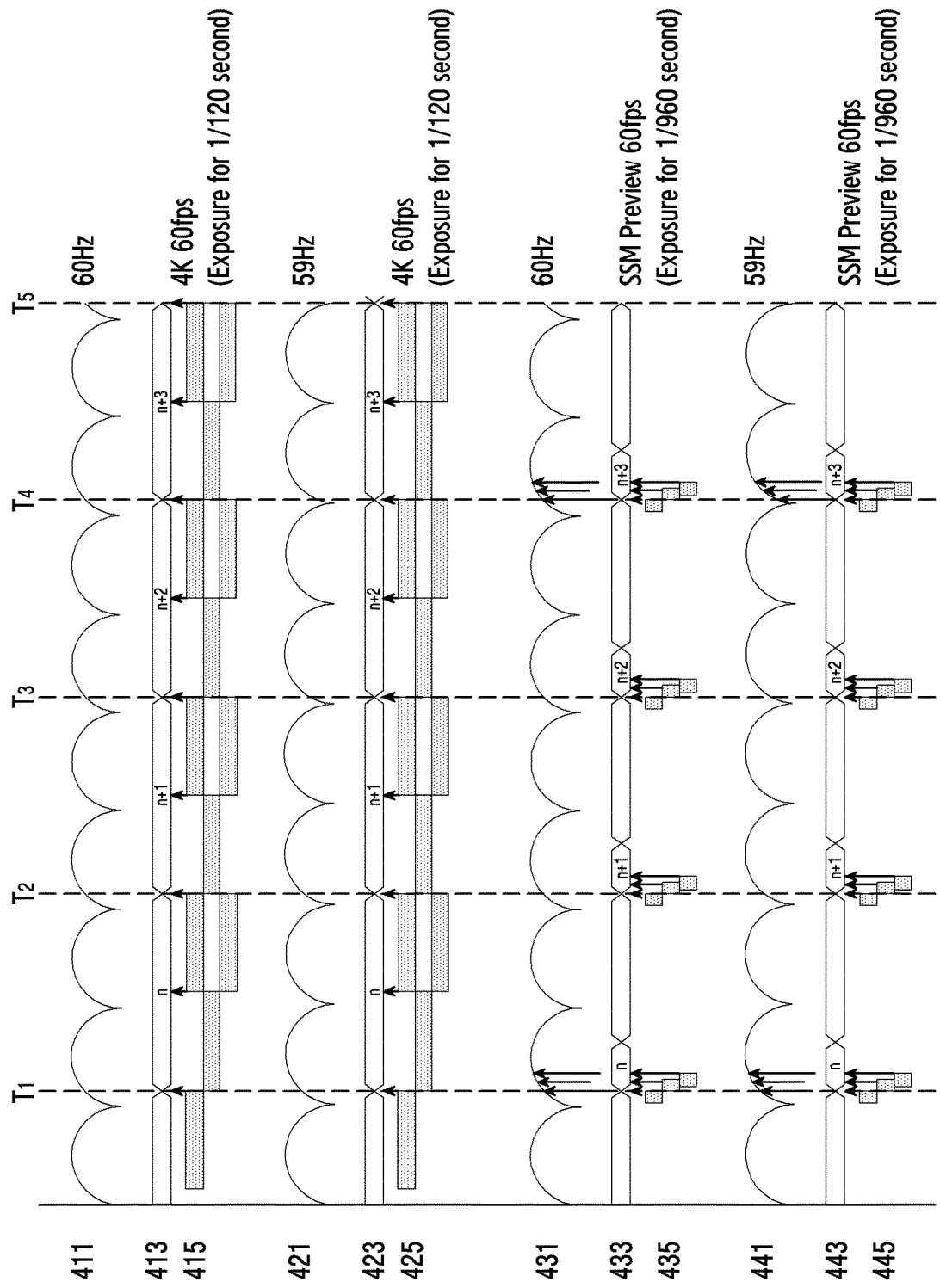
FIG. 4 is a diagram illustrating an example of a flicker occurring when an electronic device records an image according to various embodiments.

FIG. 4 is a diagram illustrating an example of a flicker occurring when an electronic device records an image according to various embodiments.

Referring to FIG. 4, when performing a moving image recording function, the electronic device (for example, the electronic device 101 of FIG. 1) may designate exposure times of the image sensor as being multiples of a flicker frequency period, and may avoid a flicker. For example, when the flicker frequency period is 50 Hz, the exposure time may be set to a multiple of $1/100$ second, and, when the flicker frequency period is 60 Hz, the exposure time may be set to a multiple of $1/120$ second. When the electronic device performs fast frame rate recording, the exposure time of the image sensor may be set to $1/960$ second. The electronic device may use the exposure time of at least $1/960$ second even in the preview section and the first section to obtain an image having the same image quality as a fast frame rate image.

Reference numerals 411, 413 and 415 (referred to hereinafter as 411-415) of FIG. 4 indicate a relationship among AC power (60 Hz), images of 60 fps and exposure of $1/120$ second. Reference numerals 421, 423 and 425 (referred to hereinafter as 421-425) of FIG. 4 indicate a relationship among AC power (for example, 59 Hz), images of 60 fps and exposure of $1/120$ second. As indicated by reference numerals 411-415 of FIG. 4, when the exposure time of the image sensor is an integer multiple of a flicker frequency (60 Hz) period, a flicker of an obtained image can be avoided. However, as indicated by reference numerals 421-425 of FIG. 4, when the exposure time of the image sensor is not an integer multiple of a flicker frequency (59 Hz) period, an image may include a flicker. For example, when artificial illuminance is used using AC power of 59 Hz as indicated by reference numeral 421 of FIG. 4, and exposure of $1/120$ second is used as indicated by reference numeral 425 of FIG. 4, an obtained image may include a flicker as indicated by reference numeral 423 of FIG. 4. For Example, when exposure time is not an integer multiple of a flicker frequency, an image obtained may include flickers at times T1-T5 as shown in FIG. 4.

Reference numerals 431, 433 and 435 (referred to hereinafter as 431-435) of FIG. 4 indicate a relationship among AC power (60 H), images of 60 fps and exposure of $1/960$ second. Reference numerals 441, 443 and 445 (referred to hereinafter as 441-445) of FIG. 4 indicate a relationship among AC power (for example, 59 Hz), images of 60 fps and exposure of $1/960$ second. In the case of preview and normal frame rate recording, the image sensor may operate at exposure time of $1/960$ second, and the processor may generate images at 60 fps in a flicker frequency period. Accordingly, when the exposure time (for example, $1/960$ second) of the image sensor is not an integer multiple of AC power (for example, 59 Hz), preview images and images obtained in the first section (for example, 60 fps) may include flickers at times T1, T2, T3, T4 and T5 (referred to hereinafter as T1-T5) as shown in FIG. 4.

As shown in FIG. 4, when the exposure time of the image sensor is not the integer multiple of the flicker frequency, a flicker may occur with respect to 960 fps fast image frames, and a flicker may occur with respect to slow image frames before 960 fps image frames due to a short exposure time. In addition, when a frequency of a flicker of a light source (for example, 59 Hz) is not consistent with a rate (60 fps) of a moving image, a flicker may appear in a different form in each frame. When fast frame rate recording is performed, the electronic device may need to solve a flicker regarding a slow image frame.

In various embodiments, the image sensor of the electronic device may obtain images for an exposure time for performing fast frame rate recording. The electronic device may identify a flicker frequency in the first section, may generate images of the first section by selecting an image having maximum luminance within the flicker frequency period, and may process the generated images and then may store the images at the second designated frame rate.

In various embodiments, the image sensor of the electronic device may obtain images for an exposure time for performing fast frame rate recording. The electronic device may identify a flicker frequency in the first section, select a plurality of images selected within the flicker frequency period, detect luminance of the selected images and generate first section images based on an average luminance value, and process the first section images and store the images at the second designated frame rate.

Figure 5:
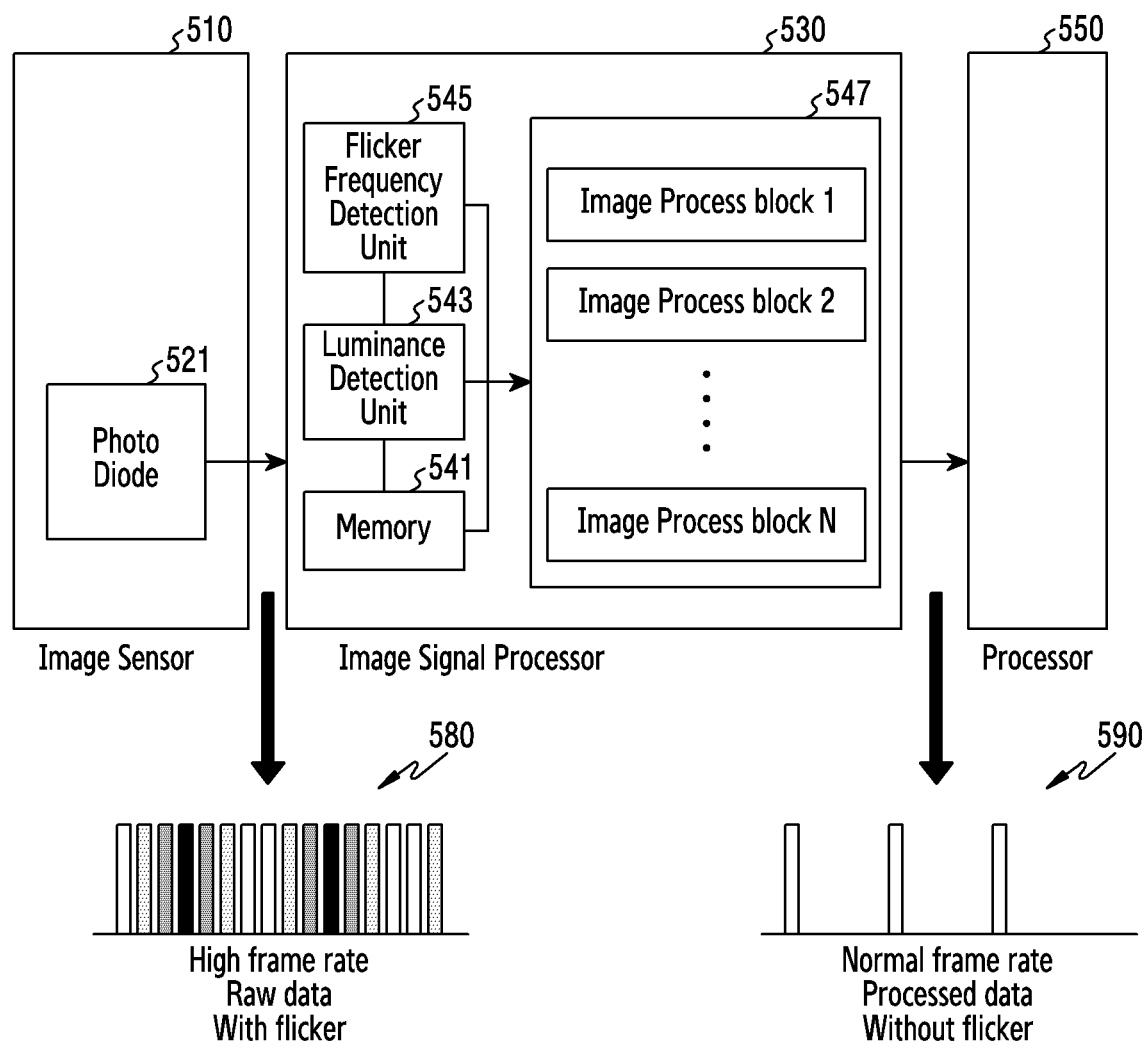
FIG. 5 is a diagram illustrating an example of a first configuration of an electronic device according to various embodiments.

FIG. 5 is a diagram illustrating an example of a first configuration of an electronic device according to various embodiments.

Referring to FIG. 5, the electronic device (for example, the electronic device 101 of FIG. 1) may include an image sensor 510, an image signal processor (e.g., including image processing circuitry) 530, and a processor (e.g., including processing circuitry) 550. The image sensor 510 (for example, the image sensor 230 of FIG. 2) may include a photo diode 521. The image signal processor 530 may include a memory 541, a luminance detection unit (e.g., including luminance detecting circuitry) 543, a flicker frequency detection unit (e.g., including flicker frequency detecting circuitry) 545, and an image processing unit (e.g., including image processing circuitry) 547. The image signal processor 530 may be disposed in a camera module (for example, the camera module 180 of FIG. 1). The image signal processor 530 may be included in a processor (for example, the processor 120 of FIG. 1). The image signal processor 530 may be included in the image sensor 510. The processor 550 may include a video encoder. The processor 550 may be the processor 120 of FIG. 1.

The photodiode 521 of the image sensor 510 may obtain images of a fast frame rate (for example, 960 fps) based on a fast frame rate exposure time (for example, ⅟₉₆₀ second). Images output from the image sensor 510 may be fast frame images including a flicker (high frame rate raw data with flicker) as indicated by reference numeral 580 of FIG. 5.

The fast frame images output from the image sensor 510 may be stored in the memory 541 of the image signal processor 530. The flicker frequency detection unit 545 may include various flicker frequency detecting circuitry and identify a frequency of a flicker included in the obtained images. The flicker frequency may be a frequency of AC power. For example, the flicker frequency may be detected using a motion detection unit. The flicker frequency detection unit 545 may set a plurality of small flicker windows on a displayed image, may grasp the number of edges of a counter according to a screen change using the motion detection unit, may identify the presence of a flicker by adding the number of flicker detection windows detecting more than a predetermined number edges, and may identify the flicker frequency based on the identified flicker. The flicker frequency detection unit 545 may sense a pattern of the screen change in the obtained image using the motion detection unit, may identify a regular movement of the flicker by excluding an irregular movement, and may identify the flicker frequency using the identified flicker.

The luminance detection unit 543 may include various luminance detecting circuitry and detect luminance of the detected images. The images obtained in the image sensor 521 may be obtained with different luminance based on a change in ambient illumination of an object. For example, the change in the illumination may be caused based on the frequency of the AC power applied to an illumination device. For example, the luminance detection unit 543 may identify luminance of the images using histogram. The histogram may include values indicating distribution of light and shade values of pixels in images.

The image processing unit 547 may include various image processing circuitry including a plurality of image process blocks 1 to N. The image processing unit 547 may process the images by performing, for example, and without limitation, image correction (for example, auto white balance, auto exposure, auto focusing, lens shading correction, dead pixel correction), image scaling, color conversion, color interpolation, image processing chain (IPC) (noise reduction, gamma correction, luminance correction), or the like.

In various embodiments, the image signal processor 530 may include various image processing circuitry and process fast frame images as indicated by reference number 580 of FIG. 5, which are stored in the memory 541, and may generate first section images (normal frame rate images (normal frame rate processed data without flicker)) capable of avoiding a flicker as indicated by reference numeral 590 of FIG. 5. The image signal processor 530 may output first designated frame rate (fast frame) images stored in the memory 541 in the second section in which fast frame rate images are generated. The image signal processor 530 may identify a flicker frequency through the flicker frequency detection unit 545 when generating a first section image. The image signal processor 530 may select a plurality of frame images which are based on the flicker frequency from the fast frame images (for example, 960 fps) stored in the memory 541, and may detect luminance of the selected plurality of frame images through the luminance detection unit 543. The image signal processor 530 may select a frame image having maximum luminance within the flicker frequency, and may generate the image having the maximum luminance as an image of the first section. For example, the image signal processor 530 may identify the frequency of the flicker through the flicker frequency detection unit 545, and may generate an image having a frame rate (second designated frame rate) lower than the fast frame rate (first designated frame rate) using some frames selected from the fast frame images stored in the memory 541 based at least on the flicker frequency.

In various embodiments, the image signal processor 530 may select an image of a brightest frame from the fast frame images of the flicker frequency section, and may mark or index the corresponding frame information. For example, the image signal processor 530 may include the selected frame information to a header (embedded header), and may output the information. For example, the image signal processor 530 may configure information regarding the brightest frame image in the fast frame images obtained within the flicker frequency period as a separate ID and frame counter information (time) in the header, and may output the information.

In various embodiments, the image signal processor 530 may select at least some of the fast frame images of the flicker frequency section. The image signal processor 530 may detect luminance of the selected images through the luminance detection unit 543, and may add and average luminance of the images and may output the average. For example, the image signal processor 530 may add and average luminance of a part or all of the fast frame images within the flicker frequency period, and may configure information related to a corresponding frame image as a separate ID and frame counter information (time) in the header, and may output the information.

The processor 550 may include various processing circuitry including a video coder. The processor 550 may code the fast frame images or normal frame images output from the image signal processor 530, and may store as images of the second designated frame rate in a memory (for example, the memory 130 of FIG. 1).

Figure 6:
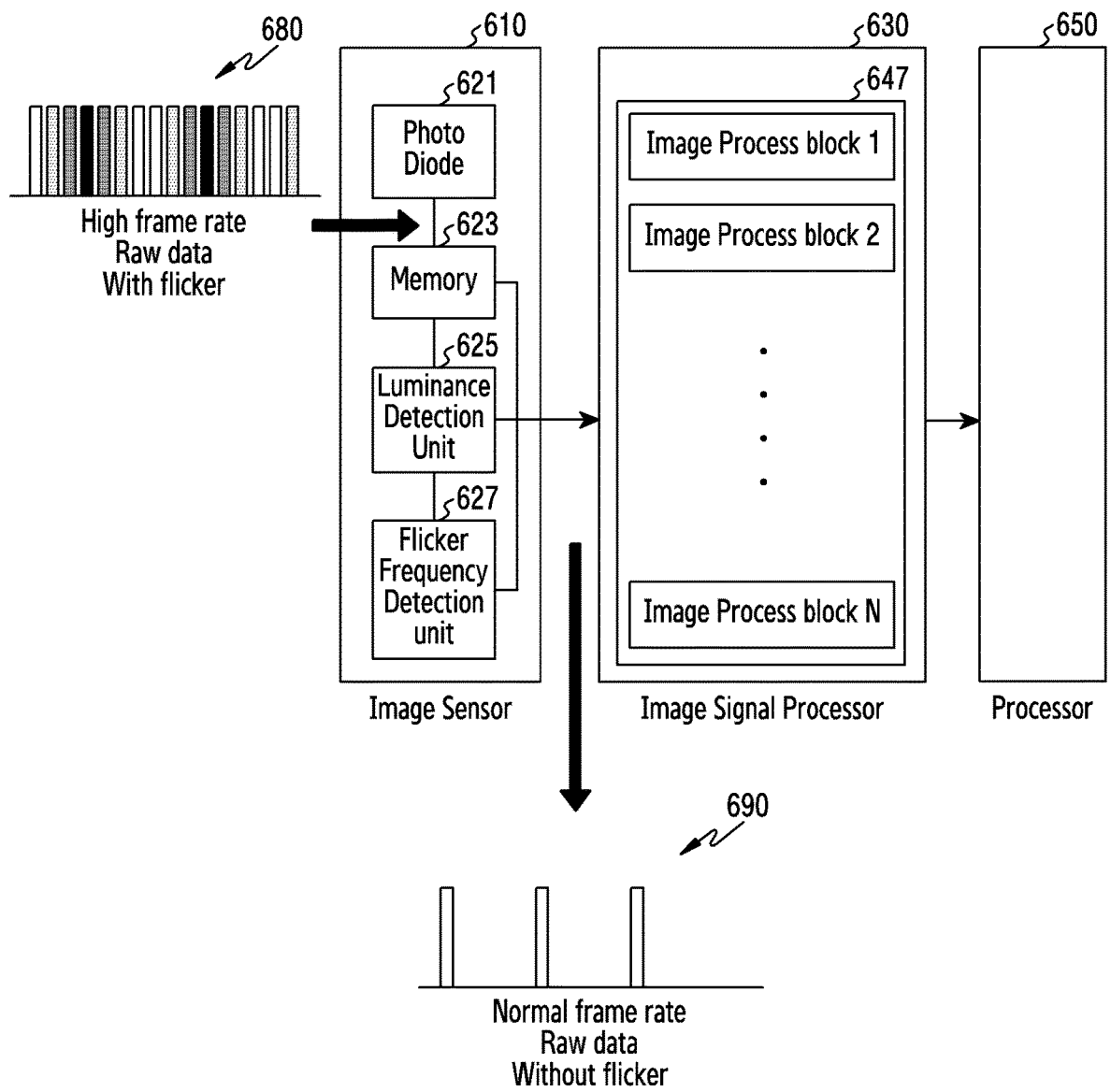
FIG. 6 is a diagram illustrating an example of a second configuration of an electronic device according to various embodiments.

FIG. 6 is a diagram illustrating an example of a second configuration of an electronic device according to various embodiments.

Referring to FIG. 6, the electronic device (for example, the electronic device 101 of FIG. 1) may include an image sensor 610, an image processor (e.g., including image processing circuitry) 630, and a processor (e.g., including processing circuitry) 650. The image sensor 610 (for example, the image sensor 230 of FIG. 2) may include a photo diode 621, a memory 623, a luminance detection unit (e.g., including luminance detecting circuitry) 625, and a flicker frequency detection unit (e.g., including flicker detecting circuitry) 627. The image signal processor 630 may include an image processing unit (e.g., including image processing circuitry) 647. The image signal processor 630 may be disposed in a camera module (for example, the camera module 180 of FIG. 1). The image signal processor 630 may be included in a processor (for example, the processor 120 of FIG. 1). The processor 650 may include various processing circuitry including a video encoder. The processor 650 may be the processor 120 of FIG. 1.

In various embodiments, the photo diode 621 of the image sensor 610 may obtain images of a fast frame rate (for example, 960 fps) based on a short exposure time (for example, ⅟960 second). The memory 623, the luminance detection unit 625, and the flicker frequency detection unit 627 of the image sensor 610 may have the same or similar configurations as the memory 541, the luminance detection unit 543, and the flicker frequency detection unit 545 of the image signal processor 530 of FIG. 5, and may perform the same operations as the operations thereof.

The image sensor 610 may process fast frame images stored in the memory 623 as indicated by reference numeral 680 of FIG. 6, and may generate first section images capable of avoiding a flicker (for example, normal frame rate processed data without flicker) as indicated by reference numeral 690 of FIG. 6. The image sensor 610 may output the fast frame images stored in the memory 623 when generating second section images. The image sensor 610 may select a plurality of frame images from the fast frame images (for example, 960 fps) stored in the memory 623, based on a flicker frequency, when generating the second section images, and may generate images capable of avoiding a flicker from the selected plurality of frames as the first section images (for example, 60 fps). For example, the image sensor 610 may identify the frequency of the flicker through the flicker frequency detection unit 627, and may generate images having a frame rate lower than the fast frame rate using some frames selected from the fast frame images stored in the memory 623 based at least on the flicker frequency.

In various embodiments, the image sensor 610 may select an image of a brightest frame from the fast frame images of the flicker frequency section, and may include corresponding frame information to a header (embedded header) and may output the information. For example, the image sensor 610 may configure information related to the brightest frame image among the fast frame images obtained within the flicker frequency period as a separate ID and frame counter information (time) in the header, and may output the information.

In various embodiments, the image sensor 610 may select at least some of the fast frame images of the flicker frequency section, and may add and average the selected images and may output the images. For example, the image sensor 610 may add and average luminance of some or all of the fast frame images within the flicker frequency period, and may configure information related to the corresponding frame image as a separate ID and frame counter information (time) in the header, and may output the information.

The image signal processor 630 may include various image signal processing circuitry including the image processing unit 647. The image processing unit 647 may include various image processing circuitry including a plurality of image process blocks 1-N. The image processing unit 647 may process an image by performing image correction, image scaling, color conversion, color interpolation, IPC, or the like.

The processor 650 may include various processing circuitry including a video encoder. The processor 650 may code the fast frame images or normal frame images output from the image signal processor 530, and may store the images in a memory (for example, the memory 130 of FIG. 1).

Figure 7:
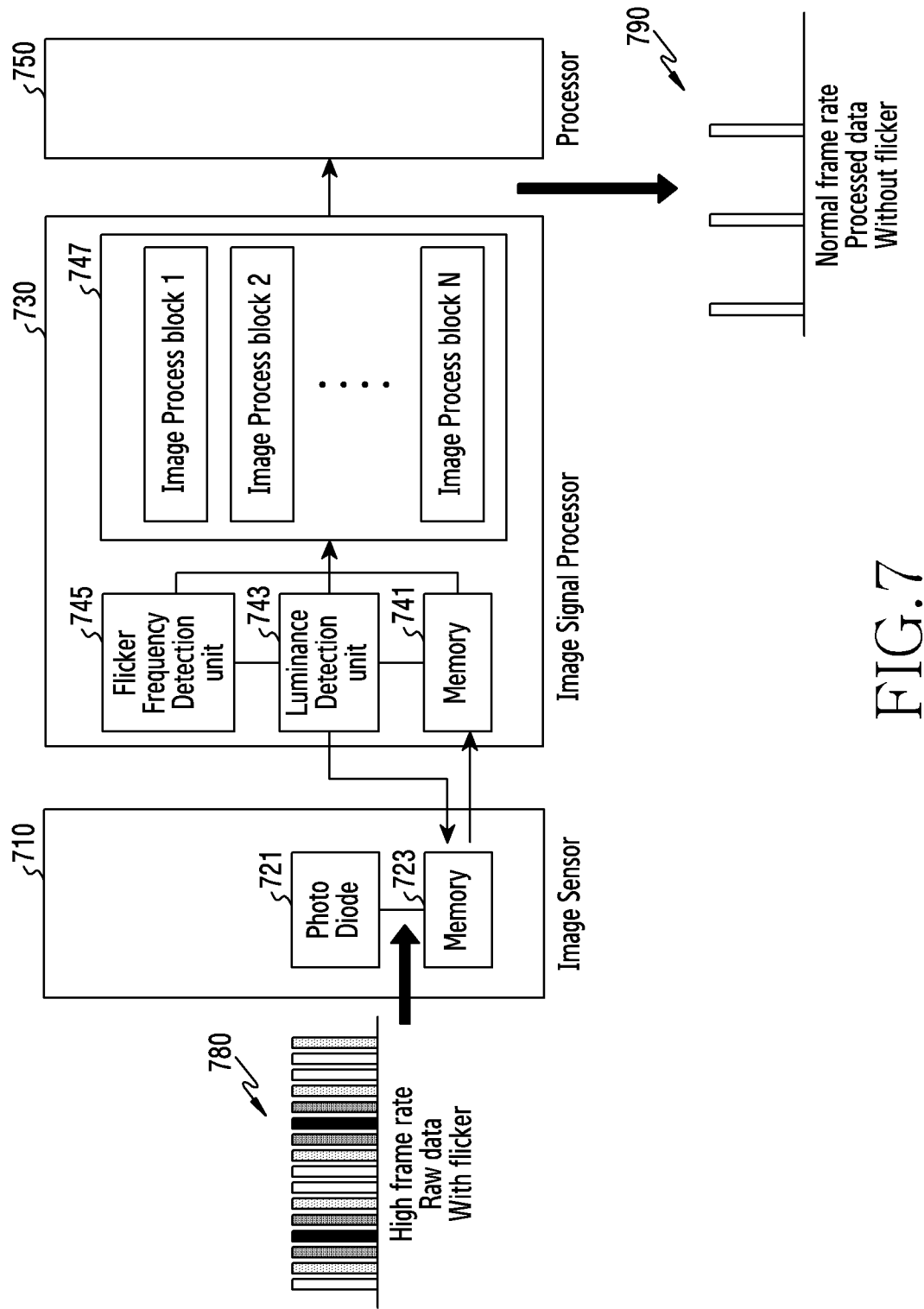
FIG. 7 is a diagram illustrating an example of a third configuration of an electronic device according to various embodiments.

FIG. 7 is a diagram illustrating an example of a third configuration of an electronic device according to various embodiments.

Referring to FIG. 7, the electronic device (for example, the electronic device 101 of FIG. 1) may include an image sensor 710, an image signal processor (e.g., including image signal processing circuitry) 730, and a processor (e.g., including processing circuitry) 750. The image sensor 710 (for example, the image sensor 230 of FIG. 2) may include a photo diode 721 and a memory 723. The image signal processor 730 may include a memory 741, a luminance detection unit (e.g., including luminance detecting circuitry) 743, a flicker frequency detection unit (e.g., including flicker frequency detecting circuitry) 745, and an image processing unit (e.g., including image processing circuitry) 747. The image signal processor 730 may be disposed in a camera module (for example, the camera module 180 of FIG. 1). The image signal processor 730 may be included in a processor (for example, the processor 120 of FIG. 1). The processor 750 may include various processing circuitry including a video encoder. The processor 750 may be the processor 120 of FIG. 1.

The photo diode 721 of the image sensor 710 may obtain images of fast frames (for example, 960 fps) based on an exposure time of fast frame rate recording (for example, ⅟960 second). Images output from the image sensor 710 may be fast frame images including a flicker (high frame rate raw data with flicker) as indicated by reference numeral 780. The memory 723 may store the obtained fast frame images.

When the fast frame images are obtained, the image sensor 710 may have a difficulty in transmitting the obtained images to the image signal processor 730 in real time due to restriction of hardware. For example, when data transmission paths of the image sensor 710 and the image signal processor 730 have a difficulty in transmitting fast data (for example, when the image signal processor 730 is positioned in the processor), the image sensor 710 may not transmit image data of a high capacity within a short time. When fast frame rate recording is performed, the image sensor 710 may store (buffer) the image data of the high capacity obtained at the fast rate in the memory 723, and may transmit the image data to the image signal processor 730 based on transmission quality.

The image signal processor 730 may include various image signal processing circuitry and receive the images stored in the image sensor 723, as indicated by reference numeral 780, and may store the images in the memory 741. The memory 741, the luminance detection unit 743, the flicker frequency detection unit 745, and the image processing unit 747 of the image signal processor 730 may have the same or similar configurations as the memory 541, the luminance detection unit 543, the flicker frequency detection unit 545, and the image processing unit 547 of the image signal processor 530 of FIG. 5, and may perform the same or similar operations as the operations thereof.

The image signal processor 730 according to various embodiments may include various image signal processing circuitry and input the fast frame images as indicated by reference numeral 780 as described above, and may generate normal frame images capable of avoiding a flicker included in the fast frame images as indicated by reference numeral 790 of FIG. 7.

An operation of generating first section images and second section images will be described with reference to FIGS. 3A, 5, 6, and 7.

In various embodiments, the image sensor (for example, the image sensor 510, the image sensor 610, and the image sensor 710) may obtain 60 fps (second designated frame rate) images before a user presses a moving image recording button (in a preview section). The images obtained in the image sensor may be displayed. In this case, the 60 fps images may be displayed on a display as 60 fps images, and the displayed images may not be stored.

Thereafter, when the user presses a recording button, the image sensor may internally obtain 960 fps (first designated frame rate) images in the section 311 of FIG. 3A, and 60 fps (second designated frame rate) images may be output to the processor (for example, the processor 550, the processor 650, the processor 750). In this case, the images may be displayed as the 60 fps images on the display, and may be stored in the memory as 30 fps images (for example, when the second designated frame rate is 30 fps). For example, the processor may store one image of the two 60 fps images.

When a designated input occurs in the section 311 of FIG. 3A, the operation in the section 321 of FIG. 3A may be performed. When a user input or a motion is detected in the section 321 of FIG. 3A, the image sensor may obtain images which are output at 960 fps, and may output the images, and the processor may store the 960 fps images. The images may be stored as 30 fps images (for example, when the second designated frame rate is 30 fps). In this case, the images displayed on the display may be 60 fps images.

When the designated input is disabled in the section 321 of FIG. 3A, the operation in the section 313 of FIG. 3A may be performed. In this case, when the user stops recording or performs the operation of recording second section images once, the electronic device may return to the preview section. However, when the operation of recording the second section images is performed continuously or the designated input is not disabled, the operation of obtaining 960 fps images and storing as 30 fps images may be performed.

In various embodiments, the image signal processor may be included in the processor, or may be configured independently from the processor. For example, the image signal processor 530 of FIG. 5 may be included in the processor 550, the image signal processor 630 of FIG. 6 may be included in the processor 650, and the image signal processor 730 of FIG. 7 may be included in the processor 750. The image signal processor may perform a color reproduction function of the image obtained in the image sensor, and may further include a flicker signal processor which generates second section images based on a flicker frequency. For example, the image signal processor 530 of FIG. 5 may further include a flicker signal processor including the flicker frequency detection unit 545 and the luminance detection unit 543, and the image signal processor 730 of FIG. 7 may further include a flicker signal processor including the flicker frequency detection unit 745 and the luminance detection unit 743. The flicker signal processor may select a plurality of frame images based on a flicker frequency, may select a frame image having maximum luminance from among the selected plurality of frame images, and may generate an image of the second section (second designated frame rate image).

When the flicker signal processor is positioned in the image sensor (for example, when the image sensor 610 of FIG. 6 further includes the luminance detection unit 625 and the flicker frequency detection unit 627), the image sensor 610 may output second designated frame rate (60 fps) images, and may internally find frames having similar luminance using the flicker signal processor, and may output the frames. For example, the image sensor 610 may obtain images corresponding to 960 fps, and may output frames having similar luminance from among these images, or may add signals and may output the signals as 60 fps images. For example, the image sensor 610 may predict times of the frames having similar luminance based on a flicker frequency, and may generate second section images by selecting images of the predicted times as 60 fps images.

In various embodiments, when performing a moving image recording operation, the electronic device may generate first section images to identify a motion of an object, and may generate second section images to obtain images of a moving object at a fast rate and to store the images. To avoid a flicker when generating the first section images, the electronic device may generate the first section images by selecting a brightest frame image from fast frame images obtained in a flicker frequency period, or by averaging luminance of a part or all of the frame images in the flicker frequency period. In another example, the electronic device may generate second section images by selecting the brightest frame image from the fast frame images, or by averaging luminance of a part or all of the frame images within the flicker frequency period.

Figure 8:
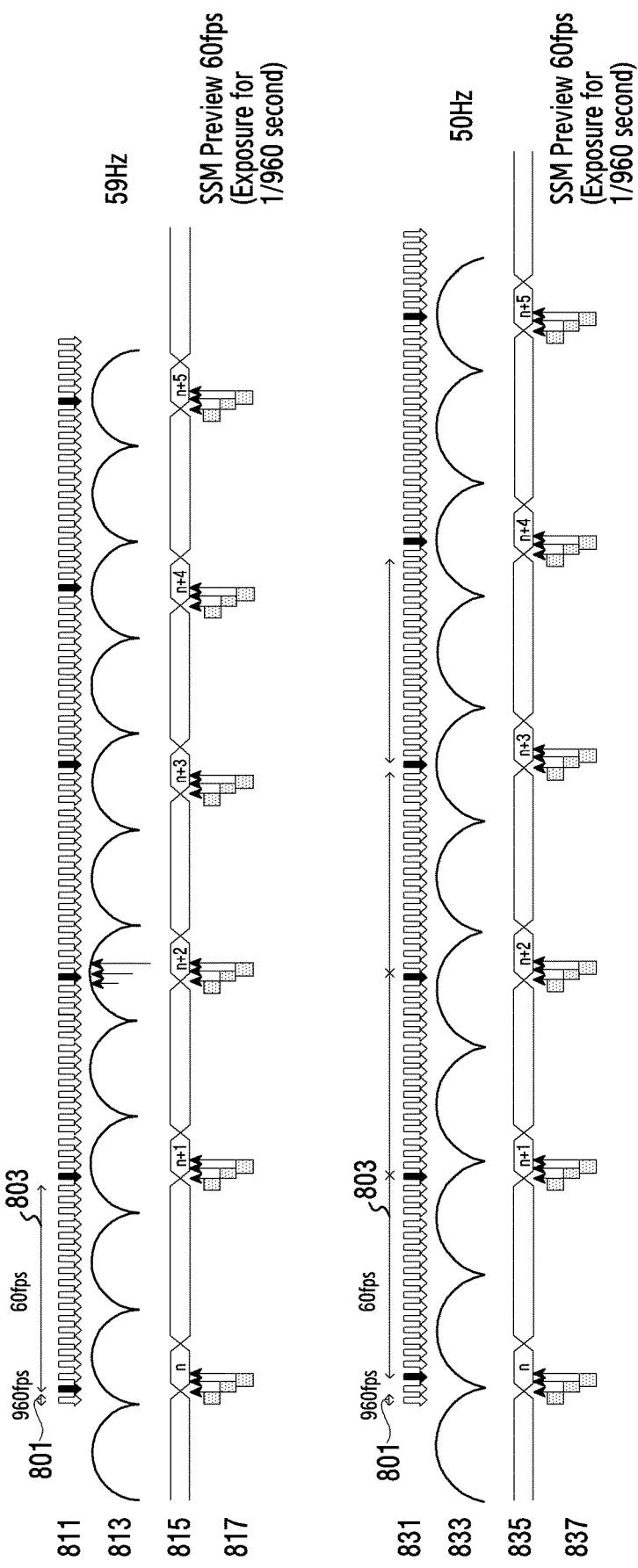
FIG. 8 is a diagram illustrating an example operation of selecting a bright frame image within a flicker period in an electronic device according to various embodiments.

FIG. 8 is a diagram illustrating an example operation of selecting a bright frame image in a flicker period (as called a flick frequency period) in an electronic device according to various embodiments.

Referring to FIG. 8, when performing normal frame rate recording, the electronic device (for example, the electronic device 101 of FIG. 1) may identify a frequency of AC power, and may select a brightest frame image within the frequency period of the AC power identified. The frequency of the AC power may be a flicker frequency. In FIG. 8, reference numeral 801 may indicate a fast rate frame (960 fps) section (second section), and reference numeral 803 may indicate a normal rate frame (60 fps) section (first section). The frequency of the AC power may change according to an ambient environment. In addition, the frequency of the AC power may vary by country. For example, AC power of 60 Hz or 50 Hz may be used according to a country.

In FIG. 8, reference numeral 811 may indicate fast frame images of 960 fps, reference numeral 813 may indicate AC power of 59 Hz, and reference numerals 815 and 817 may indicate display examples of normal frame images of 60 fps and exposure time of 1/960 second. In addition, reference numeral 831 in FIG. 8 may indicate fast frame images of 960 fps, reference numeral 833 may indicate AC power of 50 Hz, and reference numerals 835 and 837 may indicate display examples of normal frame images of 60 fps and exposure time of 1/960 second.

When the frequency of AC power is 59 Hz as indicated by reference numeral 813 of FIG. 8 or 50 Hz as indicated by reference numeral 833 of FIG. 8, 60 fps images generated in the first section may include a flicker. The image sensor (for example, the image sensor 230 of FIG. 2) may obtain 960 fps frame images, and may transmit the obtained images to the processor (for example, the processor 120). The processor may select a frame image having set luminance (for example, a frame image having maximum luminance among the frame images) based on a flicker frequency (for example, 60 Hz, 59 Hz, 50 Hz), and may process the selected frame image and may store the frame image at the second designated frame rate. The flicker frequency may be identified by another sensor of the electronic device, and may be extracted based on the obtained image (for example, by detecting luminance of the fast frame images and analyzing a period of frame images having the same luminance). The processor may select a frame image of the first section based on a header (embedded header) or frame counter information (time information) output from the image sensor.

In various embodiments, to avoid a flicker which may occur in the first section, the electronic device may identify a flicker frequency in the preview section, and may select the brightest frame image within the identified flicker frequency period. For example, the electronic device may scan 960 fps frame images within the flick frequency period in the first section, and may select a frame having the highest luminance (peak frame) as a normal frame rate recording image. The scanning and selecting is performed based on luminance information of the frame image and further information such as gyro may be used. The electronic device may slowly scan during a predetermined frame to minimize buffering of the normal frame rate image (and a preview image). Selecting a frame image in the first section may be performed in the image signal processor as shown in FIGS. 5 and 7, or may be performed in the image sensor as shown in FIG. 6. The image signal processor may be configured independently between the image sensor and the processor, or may be included in the processor or may be included in the image sensor.

Figure 9:
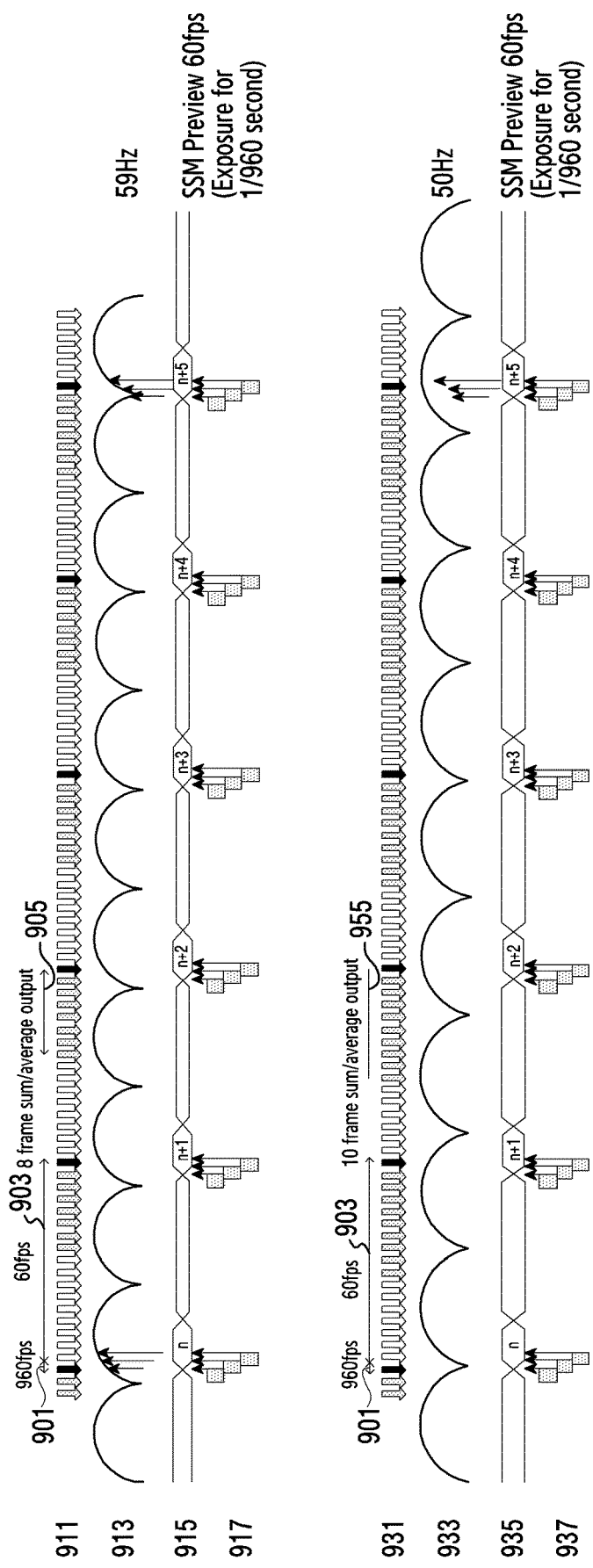
FIG. 9 is a diagram illustrating an example operation of generating an image by averaging frame images within a flicker period in an electronic device according to various embodiments.

FIG. 9 is a diagram illustrating an example operation of generating a normal frame rate recording image by averaging frame images within a flicker period in an electronic device according to various embodiments.

Referring to FIG. 9, when performing normal frame rate recording, the electronic device (for example, the electronic device 101 of FIG. 1) may identify a frequency of AC power, and may generate images by adding and averaging luminance of frame images within the frequency period of the AC power identified. In FIG. 9, reference numeral 901 may indicate a fast rate frame (960 pfs) section (second section), and reference numeral 903 may indicate a normal rate frame (60 fps) section (first section). The frequency of the AC power may vary by country. For example, AC power of 60 Hz or 50 Hz may be used according to a country. Reference numeral 905 of FIG. 9 may indicate a section for generating frame images in a flicker frequency period of the first section. For example, reference numeral 905 of FIG. 9 illustrates an example in which the flicker frequency is 60 Hz, and 8 960 fps images are selected in the flicker frequency period. Reference numeral 955 of FIG. 9 illustrates an example in which the flicker frequency is 50 Hz and 10 960 fps images are selected in the flicker frequency period.

In FIG. 9, reference numeral 911 may indicate fast frame images of 960 fps, reference numeral 913 may indicate AC power of 59 Hz, and reference numerals 915 and 917 may indicate display examples of normal frame images of 60 fps and exposure time of 1/960 second. In addition, in FIG. 9, reference numeral 931 may indicate fast frame images of 960 fps, reference numeral 933 may indicate AC power of 50 Hz, and reference numerals 935 and 937 may indicate display examples of normal frame images of 60 fps and exposure time of 1/960 second.

The image sensor (for example, the image sensor 230 of FIG. 2) may obtain 960 fps images, and the processor (for example, the processor 120 of FIG. 1) may average (or sum) luminance of 960 fps images in the flicker frequency section, and may output as 60 fps frames. As indicated by reference numerals 905 and 955 of FIG. 9, the number of frame images to be averaged in the first section may vary according to a flicker frequency. For example, in the case of 60 Hz flicker, the electronic device may generate a normal frame rate recording frame image by averaging 8 frame images at the exposure of 1/960 second. In the case of 50 Hz flicker, the electronic device may generate a normal frame rate image based on 10 frame images.

According to various embodiments, an electronic device may include an image sensor, a memory, and a processor. The processor is configured to control the electronic device to: obtain a plurality of image frames including external light generated from an external light source and an external object at a first designated frame rate using the image sensor, based on a capturing signal; identify a frequency of a flicker related to the external light source; generate first section images for at least a part of a time for which the plurality of image frames are obtained using some frames selected from the plurality of image frames corresponding to a second designated frame rate based at least on the frequency, the second designated frame rate being lower than the first designated frame rate; generate second section images for at least a part of the time for which the plurality of image frames are obtained in response at least to a designated input using image frames obtained at the first designated frame rate after the designated input from among the plurality of image frames; and generate moving image data including at least the first section images and the second section images.

According to various embodiments, the electronic device may further include a flicker frequency detection unit comprising flicker frequency detecting circuitry configured to detect a flicker frequency based on the external light source. The processor may be configured to identify the flicker frequency using at least the flicker frequency detection unit, and to select frames having similar luminance from the plurality of image frames as the some frames based on the flicker frequency.

According to various embodiments, the processor may be configured to monitor a motion of the external object in the image based on at least a part of the plurality of image frames for at least a part of the time for which the plurality of image frames are obtained, and to recognize occurrence of the motion of the external object as the designated input.

According to various embodiments, the electronic device may further include a sensor module comprising at least one sensor configured to detect a motion of the electronic device. The processor may be configured to monitor the motion of the electronic device through the sensor module while generating the second section images using the image frames obtained after the designated input, and to generate the first section images based on occurrence of the motion of the electronic device.

According to various embodiments, the processor may be configured to scan a luminance period (or luminant period) of the plurality of image frames based on the flicker frequency, to identify peak frames corresponding to brightest frames over the period from among the plurality of image frames, and to select the peaks frames as at least a part of the some frames.

According to various embodiments, the processor may be configured to: select the first designated frame rate images which are based on the flicker frequency during a preview section; scan a luminance period of the selected first designated frame rate images, to identify a peak frame corresponding to a brightest frame over the period from among the plurality of image frames, and to store information of the identified peak frame. The processor may be configured to select the first designated frame rate images based on the flicker frequency while generating the first section images; identify luminance of a frame image corresponding to the stored peak frame information from among the selected first designated frame rate images; identify luminance of at least one frame image adjacent to the peak frame; and select a frame having highest luminance from the identified frame images at least a part of the some frames.

According to various embodiments, the processor may be configured to identify a luminance period of the plurality of image frames based on the flicker frequency, to add luminance of the plurality of image frames, to average the luminance of the plurality of image frames, and to select image frames having the average luminance as at least a part of the some frames.

According to various embodiments, an electronic device may include: an image sensor configured to obtain a plurality of image frames including external light generated from an external light source and an external object at a first designated frame rate based on a capturing signal; a processor configured to store a generated moving image; and an image signal processor. The image signal processor may be configured to: receive the plurality of image frames from the image sensor; identify a frequency of a flicker related to the external light source; generate first section images for at least a part of a time for which the plurality of image frames are obtained in the image sensor using some frames selected from the plurality of image frames corresponding to a second designated frame rate based at least on the flicker frequency, the second designated frame rate being lower than the first designated frame rate; generate second section images for at least a part of the time for which the plurality of image frames are obtained in the image sensor in response at least to a designated input using image frames obtained at the first designated frame rate after the designated input from among the plurality of image frames; and transmit moving image data including at least the first section images and the second section images to the processor.

According to various embodiments, the processor may be configured to monitor a motion of the external object in the image based on at least some of the plurality of image frames, to recognize occurrence of the motion of the external object as the designated input and to deliver the designated input to the image signal processor.

According to various embodiments, the electronic device may further include a sensor module comprising at least one sensor configured to detect a motion of the electronic device. The processor may be configured to monitor the motion of the electronic device through the sensor module while receiving the second section images, and to cause the image signal processor to generate the first section images based on occurrence of the motion of the electronic device.

According to various embodiments, the image signal processor may be configured to scan a luminance period of the plurality of image frames based on the flicker frequency, to identify peak frames corresponding to a brightest frame over the period from among the plurality of image frames, and to select the peak frames as at least a part of the some frames.

In various embodiments, the image signal processor may be configured to: select the first designated frame rate images which are based on the flicker frequency during a preview section; scan a luminance period of the selected first designated frame rate images; identify a peak frame corresponding to a brightest frame over the period from among the plurality of image frames; store information of the identified peak frame. The image signal processor may be configured to: select the first designated frame rate images which are based on the flicker frequency while generating the first section images; identify luminance of a frame image corresponding to the stored peak frame information from among the selected first designated frame rate images; identify luminance of at least one frame image adjacent to the peak frame; and select a frame having highest luminance from the identified frame images as at least a part of the some frames.

According to various embodiments, an electronic device may include an image sensor, a memory, and a processor. The processor may be configured to control the electronic device to: obtain a plurality of image frames including external light generated from an external light source and an external object at a first designated frame rate using the image sensor, based on a capturing signal; identify a frequency of a flicker related to the external light source; generate first section images for at least a part of a time for which the plurality of image frames are obtained using some frames selected from the plurality of image frames corresponding to a second designated frame rate based on the frequency, the second designated frame rate being lower than the first designated frame rate; generate the first section images based on a designated input not occurring while the plurality of image frames are obtained using some frames selected to correspond to the second designated frame rate; and generate second section images having the first designated frame rate based on the designated input occurring for at least a part of the time for which the plurality of image frames are obtained using image frames obtained after the designated input from among the plurality of image frames.

According to various embodiments, an electronic device may include: an image sensor, a memory, and a processor. The processor may be configured to control the electronic device to: obtain a plurality of image frames including external light generated from an external light source and an external object at a first designated frame rate using the image sensor, based on a capturing signal; identify a frequency of a flicker related to the external light source, and a designated input; generate first section images for at least a part of a time for which the plurality of image frames are obtained using some frames selected from a plurality of image frames obtained before the designated input from among the plurality of image frames corresponding to a second designated frame rate based at least on the flicker frequency, the second designated frame rate being lower than the first designated frame rate; generate second section images for at least a part of the time for which the plurality of image frames are obtained using a plurality of image frames obtained after the designated input from among the plurality of image frames; and generate moving image data including at least the first section images and the second section images.

Figure 10:
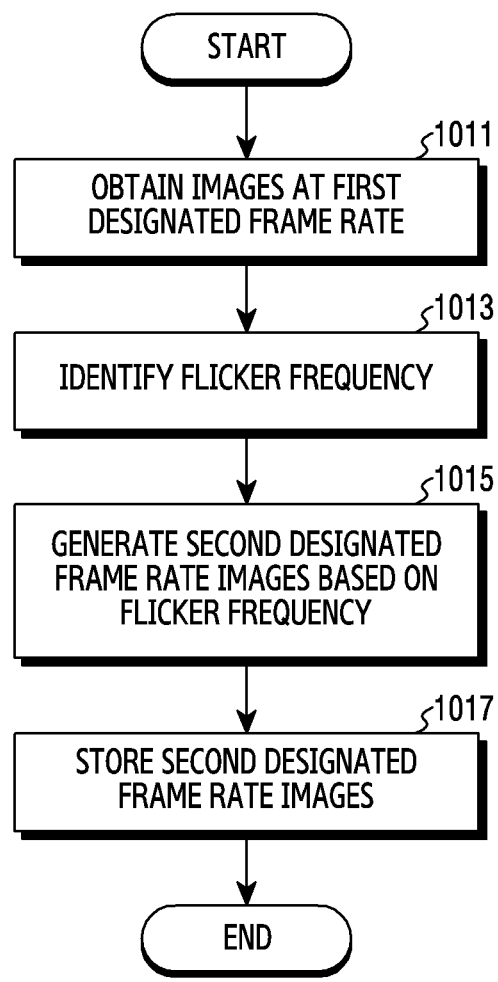
FIG. 10 is a flowchart illustrating an example operation of generating an image frame to correspond to a designated frame rate based on a flicker frequency in an electronic device according to various embodiments.

FIG. 10 is a flowchart illustrating an example operation of generating normal frame rate images in a moving image recording operation in an electronic device according to various embodiments.

Referring to FIG. 10, in operation 1011, the electronic device (for example, the electronic device 101 of FIG. 1) may obtain images at a first designated frame rate (for example, 960 fps) through an image sensor (for example, the image sensor 230 of FIG. 2). The electronic device may include a processor (for example, the processor 120 of FIG. 1), an image signal processor (for example, the image signal processor 530 of FIG. 5), and/or an image sensor (for example, the image sensor 610 of FIG. 6), based on an entity that performs an image frame transmission/reception operation, a flicker detection/processing operation, etc. For example, the image sensor (for example, the image sensor 230 of FIG. 2) of the electronic device may obtain 960 fps images based on exposure time of 1/960 second in a moving image recording operation.

In operation 1013, the electronic device 101 may identify a flicker frequency. The flicker frequency may be a frequency of AC power. When AC power is AC power of 60 Hz, the flicker frequency may be 60 Hz. A flicker frequency detection unit may be positioned in a sensor module (for example, the sensor module 176 of FIG. 1), may be positioned in the image signal processor (for example, the flicker frequency detection unit 545 of FIG. 5, the flicker frequency detection unit 745 of FIG. 7), or may be positioned in the image sensor (for example, the flicker frequency detection unit 645 of FIG. 6).

In operation 1015, the electronic device may generate images of the second designated frame rate in a second designated frame rate (for example, 60 fps) section. The electronic device may generate images having the second designated frame rate (for example, 60 fps) lower than the first designated frame rate, using the images of the first designated frame rate (for example, 960 fps) selected based on the flicker frequency (for example, 60 Hz or 50 Hz). The method of generating the second designated frame rate images may include selecting a brightest image from the 960 fps images within the flicker frequency section, or selecting an image having a luminance average value among the 960 fps images of the flicker frequency sections. The electronic device may store the generated images as the second designated frame rate images in operation 1017.

Figure 11A:
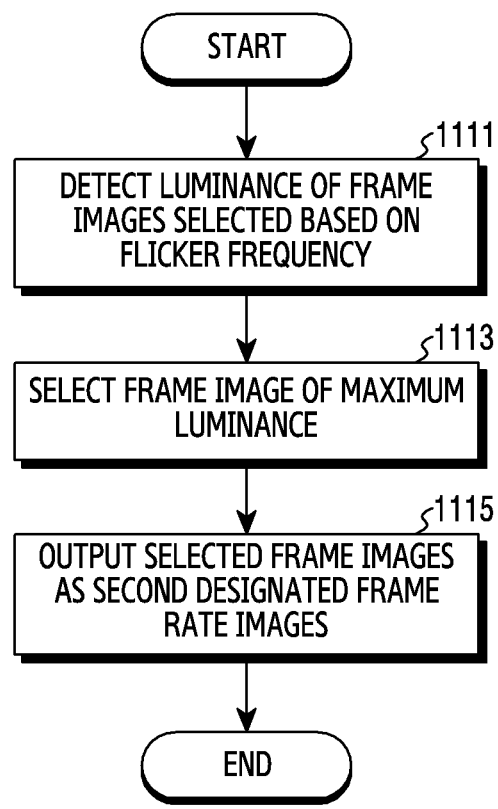
FIG. 11A is a flowchart illustrating an example method for generating an image avoiding a flicker in an electronic device according to various embodiments.
Figure 11B:
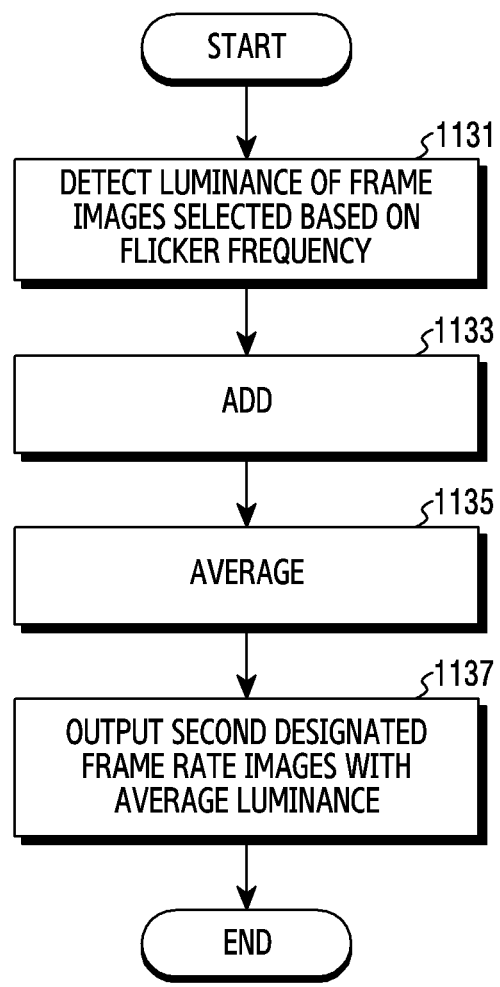
FIG. 11B is a flowchart illustrating an example method for generating the image avoiding the flicker in the electronic device according to various embodiments.

FIG. 11A is a flowchart illustrating an example method for generating an image avoiding a flicker in an electronic device according to various embodiments, and FIG. 11B is a flowchart illustrating an example method for generating the image avoiding the flicker in the electronic device according to various embodiments.

Referring to FIG. 11A, in operation 1111, the electronic device (for example, the electronic device 101 of FIG. 1) may detect luminance of 960 fps images selected based on an identified flicker frequency. In operation 1113, the electronic device may select 960 fps images having maximum luminance. In operation 1115, the electronic device may output the 960 fps images of the maximum luminance selected as images of the 60 fps section of the first designated frame rate. For example, the electronic device may generate frame images having maximum luminance, selected in the first section based on the flicker frequency, as images of the first section.

Referring to FIG. 11B, in operation 1131, the electronic device may detect luminance of the 960 fps images selected based on the identified flicker frequency. In operation 1133, the electronic device may add luminance of the selected 960 fps images in operation 1133, and may calculate the average of the result of adding based on the number of selected images in operation 1135. In operation 1137, the electronic device may output 960 fps images having the average luminance as images of the 60 fps section of the first designated frame rate.

Figure 12:
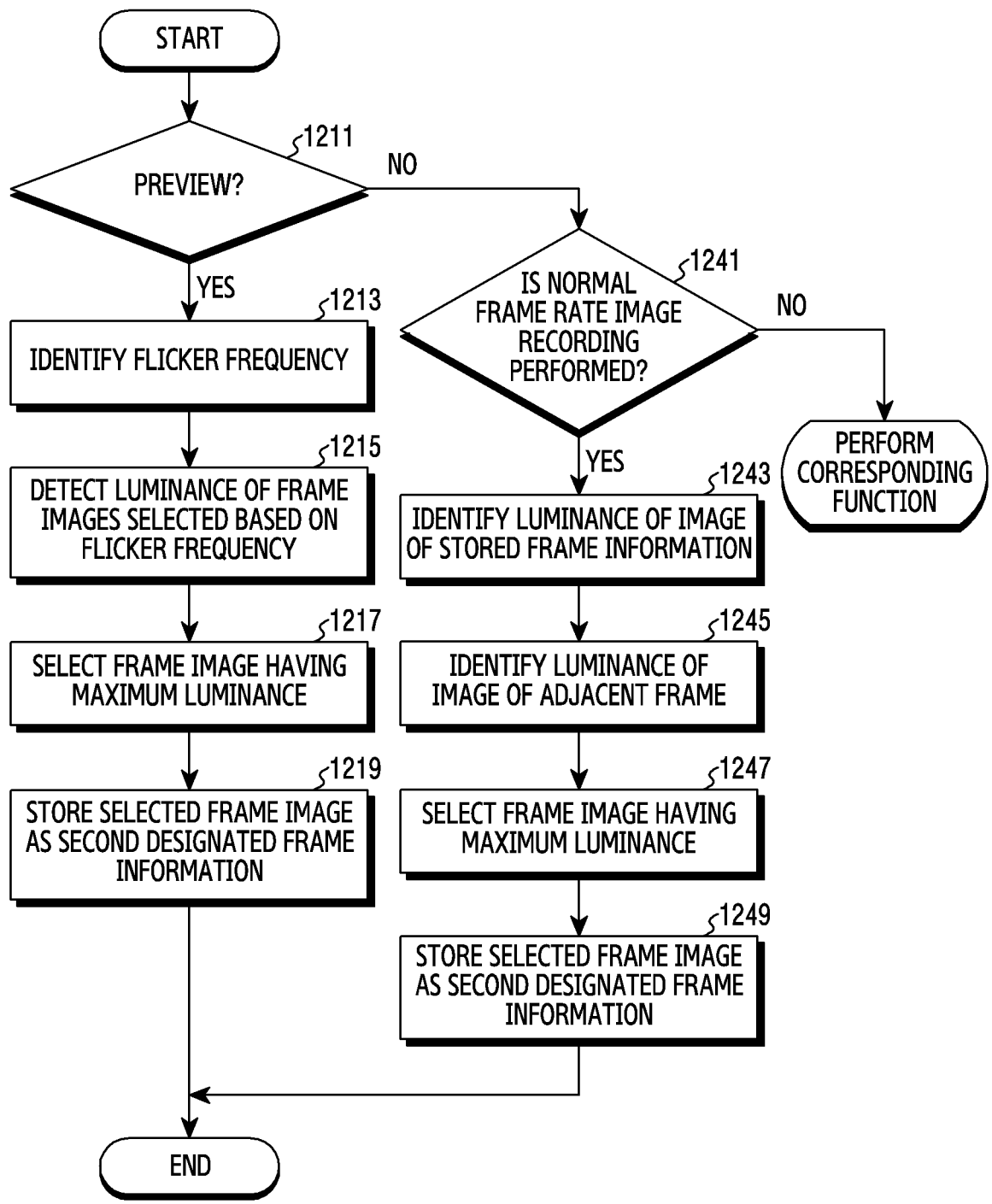
FIG. 12 is a flowchart illustrating example operations of identifying a flicker frequency and generating a frame image capable of avoiding a flicker based on a flicker frequency in an electronic device.

FIG. 12 is a flowchart illustrating example operations of identifying a flicker frequency in an electronic device, and avoiding a flicker based on a flicker frequency when recording a moving image at a slow rate.

Referring to FIG. 12, in operation 1211, the electronic device (for example, the electronic device 101 of FIG. 1) may identify a preview operation. In operation 1213 ("Yes" in operation 1211), the electronic device may identify a flicker frequency in the preview state. In operation 1215, the electronic device may detect luminance of 960 fps images selected based on the identified flicker frequency. In operation 1217, the electronic device may select a frame image having maximum luminance. In operation 1219, the electronic device may store information regarding the frame of the maximum luminance selected (for example, frame counter information). The stored frame information may be used as reference frame information when first section images are generated.

In operation 1241 ("No" in operation 1211), the electronic device may identify a first section (for example, a normal frame rate recording section). When the first section is identified, the electronic device may identify luminance of an image corresponding to the information of the second designated frame rate section (for example, 60 pfs section) stored (for example, location information of a 960 fps image having maximum luminance in the 60 fps section related to the flicker frequency) in operation 1243 ("Yes" in operation 1241). In operation 1245, the electronic device may identify luminance of a frame image adjacent to the stored frame information. For example, the electronic device may identify luminance of a previous frame and a next frame of the frame having the maximum luminance. In operation 1247, the electronic device may select a frame image having maximum luminance from the identified frames. In operation 1249, the electronic device may store the frame image having the maximum luminance selected as a second section image. The electronic device may identify the frame image having the maximum luminance based on the flicker frequency in the preview section, and may store the frame information. When generating the second section image, the electronic device may identify luminance of a frame image corresponding to the stored frame information, and may identify luminance of at least one frame image adjacent to the frame information and then may generate the frame image having maximum luminance as the second section image. In addition, the frame information generated as the second section image may be refined with new frame information and may be stored. According to various embodiments, the electronic device may identify and store the flicker frequency in the preview operation, and may generate images of the second designated frame rate section based on the identified flicker frequency.

According to various embodiments, the electronic device may identify the flicker frequency in the preview operation, may identify luminance of images of the first designated frame rate based on the identified flicker frequency, and may store an image having maximum luminance as frame information of the second designated frame rate section. The electronic device may identify a frame image based on the stored frame information, and luminance of adjacent frame images, and may select a frame image having maximum luminance from the identified frame images and may generate as an image of the first section.

Figure 13:
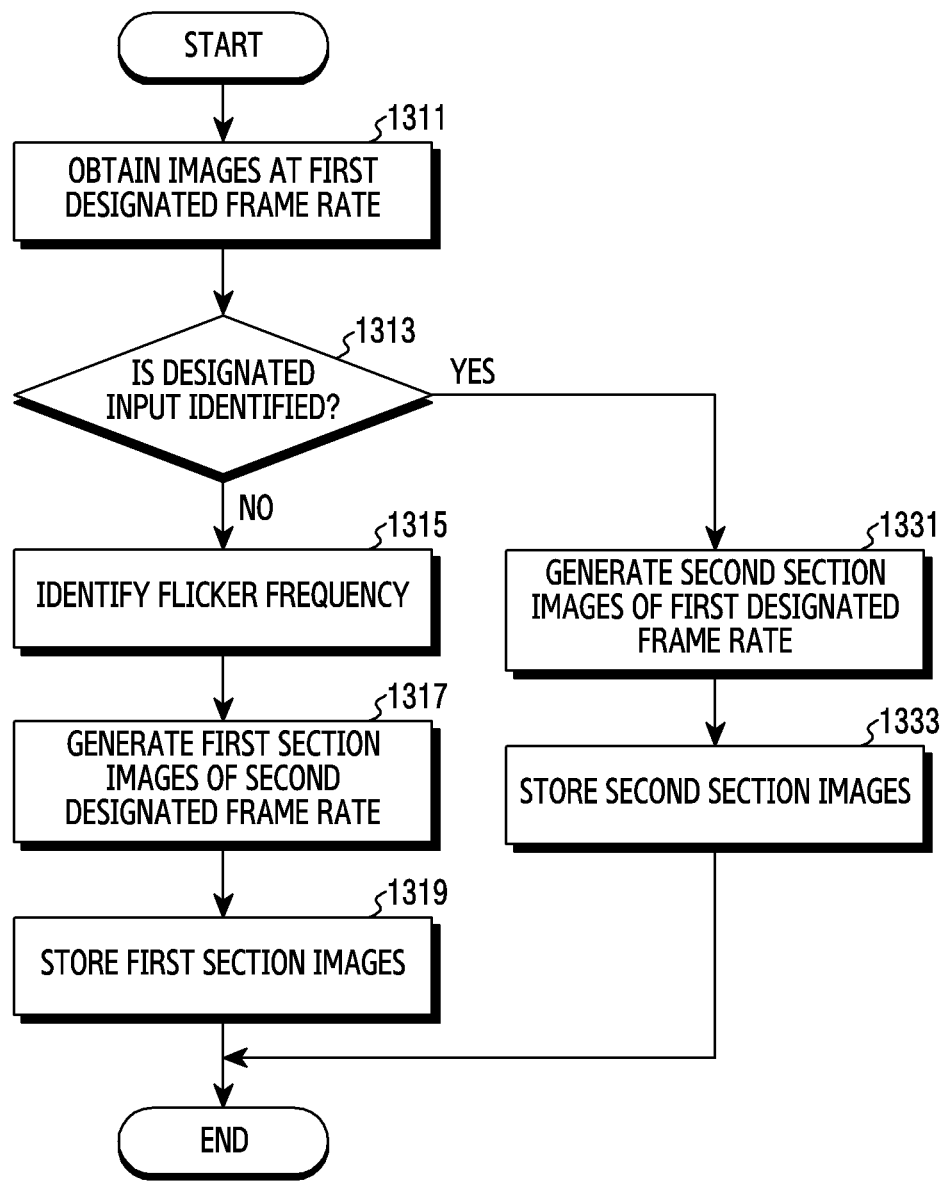
FIG. 13 is a flowchart illustrating an example method for generating a frame image to record a moving image in an electronic device according to various embodiments.

FIG. 13 is a flowchart illustrating an example method for generating section frame images in an electronic device according to various embodiments.

Referring to FIG. 13, the electronic device (for example, the electronic device 101 of FIG. 1) may obtain images at a first designated frame rate (for example, 960 fps) in operation 1311. For example, an image sensor (the image sensor 230 of FIG. 2) of the electronic device may obtain 960 fps images based on exposure time of 1/960 second. The electronic device may identify a designated input or disabling of the designated input in operation 1313. The designated input may be a slow rate moving image recording button input or detection of an object motion in the image. Disabling of the designated input may be a slow rate moving image recording disabling button input or detection of a motion of the electronic device during the slow rate moving image recording operation.

When it is identified that the designated input is disabled ("No" in operation 1313) (for example, when normal frame rate recording is identified), the electronic device 101 may identify a flicker frequency through a flicker frequency detection unit in operation 1315. The flicker frequency may be a frequency of AC power. The flicker frequency detection unit may be positioned in a sensor module (for example, the sensor module 176 of FIG. 1), may be positioned in an image signal processor (for example, the flicker frequency detection unit 545 of FIG. 5, the flicker frequency detection unit 745 of FIG. 7), or may be positioned in an image sensor (for example, the flicker frequency detection unit 645 of FIG. 6). In operation 1317, the electronic device may identify luminance of images of the first designated frame rate (for example, 960 fps) selected based on the flicker frequency (for example, 60 Hz or 50 Hz), and may generate images having a second designated frame rate (for example, a normal frame rate recording section, 60 fps). The method of generating the second designated frame rate images may include selecting a brightest image from 960 fps images within the flicker frequency section, or selecting an image having a luminance average value from the 960 fps images of the flicker frequency sections. In operation 1319, the electronic device may store the generated images as images of the first section.

When the designated input is identified ("Yes" in operation 1313), the electronic device may generate second section images of the first designated frame rate in operation 1331. The electronic device may store the second section images in operation 1333. The second section images may be the first designated frame rate images. The electronic device may convert the first designated frame rate images into the second designated frame rate images, and mays tore the images. For example, images obtained at 960 fps may be stored at 60 fps (or 30 fps).

Figure 14:
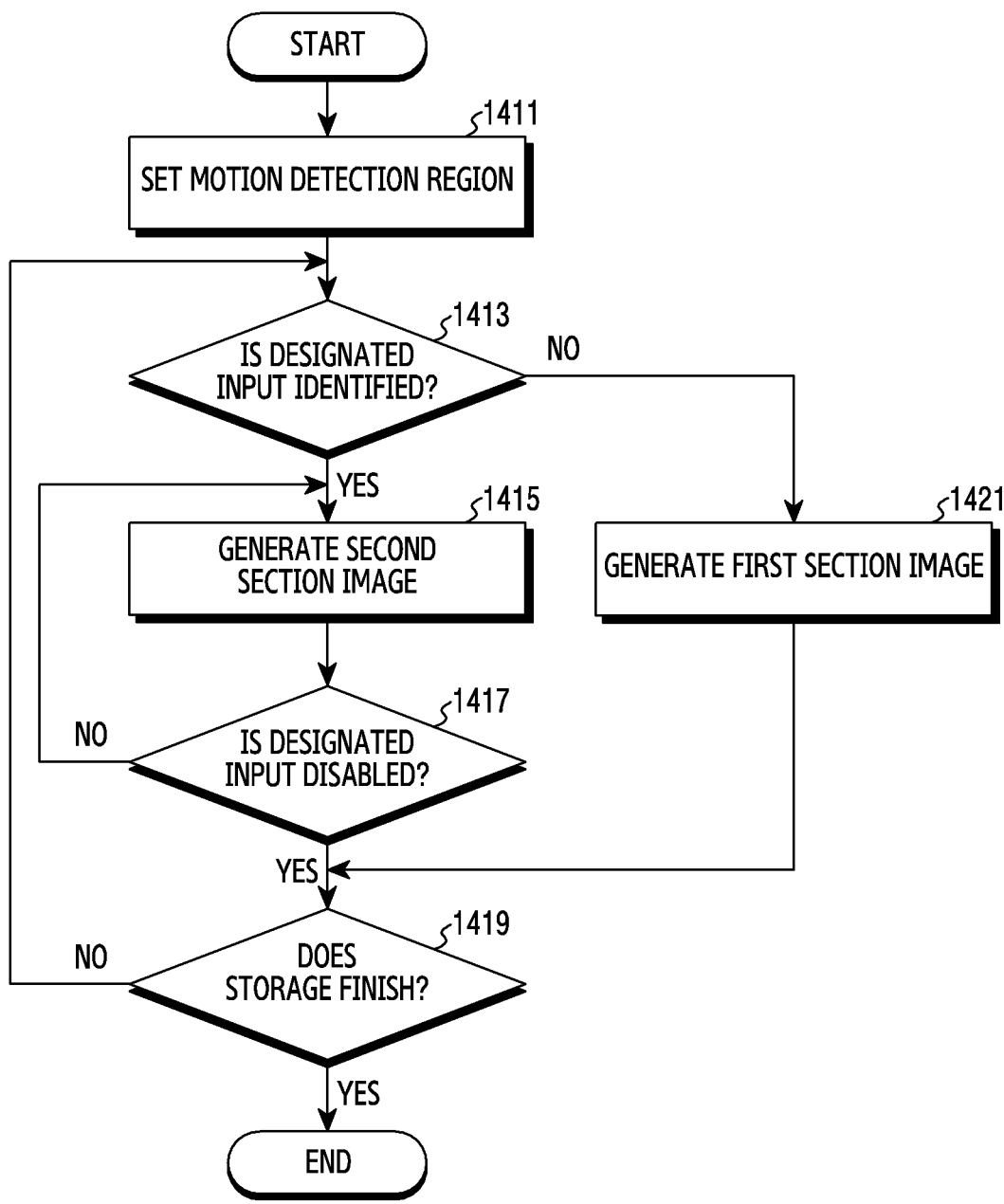
FIG. 14 is a flowchart illustrating an example method for generating a moving image in a moving image recording operation in an electronic device according to various embodiments.

FIG. 14 is a flowchart illustrating an example method for generating frame images based on obtained images in an electronic device according to various embodiments.

Referring to FIG. 14, in operation 1411, the electronic device (for example, the electronic device 101 of FIG. 1) may designate at least some region of a screen as a motion detection region. The motion detection region may be automatically or manually designated. For example, when a slow rate moving image recording operation is activated, the electronic device may designate a region of a predetermined size from the center of the screen (for example, a preview screen) as the motion detection region. For example, the electronic device may designate the motion detection region based on a user's gesture (for example, a user's gesture of drawing a closed loop).

In operation 1413, when a recording button input is occurred after the motion detection region is designated (set), the electronic device may activate a fast rate frame image recording operation. In operation 1415 ("Yes" in operation 1413), the electronic device may generate images of a second section having a first designated frame rate (for example, 960 fps). The electronic device may perform a fast rate frame image recording operation of storing the generated second section images at a second designated frame rate. The second designated frame rate may be a normal play speed of the electronic device. For example, the electronic device may store frame images obtained at a frame rate of 960 in the second section at a frame rate of 60 (or 30).

In operation 1417, when a command to disable the designated input (image recording disabling command) is identified while the second section images are generated, the electronic device may finish the operation of generating the second section images. For example, disabling of the designated input may be a user's input of disabling the recording, or may correspond to a case in which a motion of the electronic device is detected while the second section images are being generated, a case in which a designated time for which the second section images are generated elapses, and/or a case in which the number of second section images exceeds a designated image frame number. For example, when a motion of the electronic device is detected while the second section images are generated, the electronic device may finish the operation of generating the second section images, and may switch to an operation of generating first section images in operation 1421 ("No" in operation 1413). In operation 1421, the electronic device may detect luminance of a plurality of image frames selected based on the flicker frequency, and may select frame images having set luminance (for example, maximum luminance within the flicker frequency) and may generate the first section images. The first section images may be generated based on the operations of FIG. 11A or 11B.

In operation 1413, when the designated input occurs while the first section images are generated, the electronic device may switch from the operation of generating the first section images to the operation of generating the second section images. For example, the electronic device may identify a motion of an object positioned in the motion detection region while generating the first section images. When a motion of the object is identified in the motion detection region, the electronic device may identify the designated input in operation 1413. When the designated input is identified, the electronic device may generate the second section images in operation 1415.

When pressing of a recording end button is identified while the first section images or the second section images are generated in operation 1419, the electronic device may finish the operation of generating moving image data.

According to various embodiments, a method for generating a moving image of an electronic device may include: obtaining a plurality of image frames including external light generated from an external light source and an external object at a first designated frame rate using an image sensor, based on a capturing signal; identifying a frequency of a flicker related to the external light source; generating first section images for at least a part of a time for which the plurality of image frames are obtained using some frames selected from the plurality of image frames corresponding to a second designated frame rate based at least on the frequency, the second designated frame rate being lower than the first designated frame rate; and generating second section images for at least a part of the time for which the plurality of image frames are obtained in response at least to a designated input using image frames obtained at the first designated frame rate after the designated input from among the plurality of image frames.

According to various embodiments, generating the first section images may further include identifying the designated input. Identifying the designated input may include: monitoring a motion of the external object in the image for at least a part of the time for which the plurality of image frames are obtained based on at least a part of the plurality of image frames; and recognizing occurrence of the motion of the external object as the designated input for switching at least to generating the second section images.

According to various embodiments, generating the second section images may further include identifying an input for switching to generating the first section images. Identifying the input for switching to generating the first section images may include: monitoring the motion of the electronic device while generating the second section images using the image frames obtained after the designated input; and recognizing occurrence of the motion of the electronic device as the input for switching at least to generating the first section images.

According to various embodiments, generating the first section images may include: scanning a luminance period of the plurality of image frames based on the flicker frequency; identifying peak frames corresponding to brightest frames over the period from among the plurality of image frames; and selecting the peaks frames as at least a part of the some frames.

According to various embodiments, the method may further include identifying peak frame information in a preview section. Identifying the peak frame information may include: during the preview section, selecting the first designated frame rate images which are based on the flicker frequency; scanning a luminance period of the selected first designated frame rate images; identifying a peak frame corresponding to a brightest frame over the period from among the plurality of image frames; and storing information of the identified peak frame. Generating the first section images may include: selecting the first designated frame rate images based on the flicker frequency while generating the first section images; identifying luminance of a frame image corresponding to the stored peak frame information from among the selected first designated frame rate images; identifying luminance of at least one frame image adjacent to the peak frame; and selecting a frame having highest luminance from the identified frame images at least a part of the some frames.

According to various embodiments, generating the first section images may include: identifying a luminance period of the plurality of image frames based on the flicker frequency; adding luminance of the plurality of image frames; averaging the luminance of the plurality of image frames; and selecting image frames having the average luminance as at least a part of the some frames.

The electronic device according to various embodiments may identify a flicker frequency when performing a moving image recording operation, may select a plurality of fast frame images based on the flicker frequency, may identify luminance of the selected frame images, and may generate images having set luminance as images of a section in which normal frame images are recorded. Accordingly, a flicker can be avoided.

While various example embodiments of the disclosure have been illustrated and described with reference to the accompanying drawings, it will be understood by those skilled in the art that the various example embodiments are intended to be illustrative, not limiting, and that various changes in details may be made without departing from the true spirit and full scope of the disclosure, as defined, for example, in the appended claims and their equivalents.

What is claimed is:

1. An electronic device comprising:
an image sensor;
a memory; and
a processor,
wherein the processor is configured to control the electronic device to:
obtain a plurality of image frames comprising external light generated by external light source and an external object at a first designated frame rate using the image sensor, based on a capturing signal;
identify a frequency of a flicker related to the external light source;
generate first section images for at least a part of a time for which the plurality of image frames are obtained using frames selected from the plurality of image frames corresponding to a second designated frame rate based at least on the frequency, the second designated frame rate being lower than the first designated frame rate;
generate second section images for at least a part of the time for which the plurality of image frames are obtained in response at least to a designated event using image frames obtained at the first designated frame rate after the designated event from among the plurality of image frames; and
generate moving image data comprising at least the first section images and the second section images.

2. The electronic device of claim 1, further comprising a flicker frequency detection unit comprising flicker frequency detecting circuitry configured to detect a flicker frequency based on the external light source,
wherein the processor is configured to identify the flicker frequency using at least the flicker frequency detection unit, and to select frames having a similar luminance from the plurality of image frames as the selected frames based on the flicker frequency.

3. The electronic device of claim 1, wherein the processor is configured to monitor a motion of the external object in the image based on at least a part of the plurality of image frames, for at least a part of the time for which the plurality of image frames are obtained, and to recognize occurrence of the motion of the external object as the designated event.

4. The electronic device of claim 3, further comprising a sensor module comprising at least one sensor configured to detect a motion of the electronic device,
wherein the processor is configured to monitor the motion of the electronic device through the sensor module while generating the second section images using the image frames obtained after the designated event, and to generate the first section images based on occurrence of the motion of the electronic device.

5. The electronic device of claim 1, wherein the processor is configured to scan a luminance period of the plurality of image frames based on the flicker frequency, to identify peak frames corresponding to brightest frames over the period from among the plurality of image frames, and to select the peak frames as at least a part of the selected frames.

6. The electronic device of claim 1, wherein the processor is configured to:
   select the first designated frame rate images based on the flicker frequency during a preview section;
   scan a luminance period of the selected first designated frame rate images, to identify a peak frame corresponding to a brightest frame over the period from among the plurality of image frames, and to store information of the identified peak frame;
   select the first designated frame rate images based on the flicker frequency while generating the first section images;
   identify luminance of a frame image corresponding to the stored peak frame information from among the selected first designated frame rate images;
   identify luminance of at least one frame image adjacent to the peak frame; and
   select a frame having a highest luminance from the identified frame images as at least a part of the selected frames.

7. The electronic device of claim 1, wherein the processor is configured to identify a luminance period of the plurality of image frames based on the flicker frequency, to add luminance of the plurality of image frames, to average the luminance of the plurality of image frames, and to select image frames having the average luminance as at least a part of the selected frames.

8. A method for generating a moving image of an electronic device, the method comprising:
   obtaining a plurality of image frames comprising external light generated from an external light source and an external object at a first designated frame rate using an image sensor, based on a capturing signal;
   identifying a frequency of a flicker related to the external light source;
   generating first section images for at least a part of a time for which the plurality of image frames are obtained using frames selected from the plurality of image frames corresponding to a second designated frame rate based at least on the frequency, the second designated frame rate being lower than the first designated frame rate;
   generating second section images for at least a part of the time for which the plurality of image frames are obtained in response at least to a designated event using image frames obtained at the first designated frame rate after the designated event from among the plurality of image frames; and
   generating moving image data comprising at least the first section images and the second section images.

9. The method of claim 8, wherein generating the first section images further comprises identifying the designated event, and
   wherein identifying the designated event comprises: monitoring a motion of the external object in the image based on at least a part of the plurality of image frames for at least a part of the time for which the plurality of image frames are obtained; and recognizing occurrence of the motion of the external object as the designated event for switching at least to generating the second section images.

10. The method of claim 9, wherein generating the second section images further comprises identifying an input for switching to generating the first section images, and
    wherein identifying the input for switching to generating the first section images comprises: monitoring the motion of the electronic device while generating the second section images using the image frames obtained after the designated event; and recognizing occurrence of the motion of the electronic device as the input for switching at least to generating the first section images.

11. The method of claim 8, wherein generating the first section images comprises: scanning a luminance period of the plurality of image frames based on the flicker frequency; identifying peak frames corresponding to brightest frames over the period from among the plurality of image frames; and selecting the peak frames as at least a part of the selected frames.

12. The method of claim 8, further comprising identifying peak frame information in a preview section,
    wherein identifying the peak frame information comprises: selecting the first designated frame rate images based on the flicker frequency during the preview section; scanning a luminance period of the selected first designated frame rate images; identifying a peak frame corresponding to a brightest frame over the period from among the plurality of image frames; and storing information of the identified peak frame,
    wherein generating the first section images comprises: selecting the first designated frame rate images based on the flicker frequency while generating the first section images; identifying luminance of a frame image corresponding to the stored peak frame information from among the selected first designated frame rate images; identifying luminance of at least one frame image adjacent to the peak frame; and selecting a frame having a highest luminance from the identified frame images at least a part of the selected frames.

13. The method of claim 8, wherein generating the first section images comprises: identifying a luminance period of the plurality of image frames based on the flicker frequency; adding luminance of the plurality of image frames; averaging the luminance of the plurality of image frames; and selecting image frames having the average luminance as at least a part of the selected frames.

14. An electronic device comprising:
    an image sensor configured to obtain a plurality of image frames comprising external light generated from an external light source and an external object at a first designated frame rate, based on a capturing signal;
    a processor configured to store a generated moving image; and
    an image signal processor,
    wherein the image signal processor is configured to:
    receive the plurality of image frames from the image sensor;
    identify a frequency of a flicker related to the external light source;
    generate first section images for at least a part of a time for which the plurality of image frames are obtained in the image sensor using frames selected from the plurality of image frames corresponding to a second designated frame rate based at least on the flicker frequency, the second designated frame rate being lower than the first designated frame rate;
    generate second section images for at least a part of the time for which the plurality of image frames are obtained in the image sensor in response at least to a designated input using image frames obtained at the first designated frame rate after the designated input from among the plurality of image frames; and transmit moving image data comprising at least the first section images and the second section images to the processor.

15. The electronic device of claim 14, wherein the processor is configured to monitor a motion of the external object in the image based on at least one or more of the plurality of image frames, to recognize occurrence of the motion of the external object as the designated input and to deliver the designated input to the image signal processor.

16. The electronic device of claim 15, further comprising a sensor module comprising at least one sensor configured to detect a motion of the electronic device, wherein the processor is configured to monitor the motion of the electronic device through the sensor module while receiving the second section images, and to cause the image signal processor to generate the first section images based on occurrence of the motion of the electronic device.

17. The electronic device of claim 14, wherein the image signal processor is configured to scan a luminance period of the plurality of image frames based on the flicker frequency, to identify peak frames corresponding to a brightest frame over the period from among the plurality of image frames, and to select the peak frames as at least a part of the selected frames.

18. The electronic device of claim 14, wherein the image signal processor is configured to:

select the first designated frame rate images which are based on the flicker frequency during a preview section;

scan a luminance period of the selected first designated frame rate images;

identify a peak frame corresponding to a brightest frame over the period from among the plurality of image frames;

store information of the identified peak frame;

select the first designated frame rate images based on the flicker frequency while generating the first section images;

identify luminance of a frame image corresponding to the stored peak frame information from among the selected first designated frame rate images;

identify luminance of at least one frame image adjacent to the peak frame; and select a frame having highest luminance from the identified frame images as at least a part of the selected frames.

19. An electronic device comprising:
an image sensor;
a memory; and
a processor, wherein the processor is configured to control the electronic device to:

obtain a plurality of image frames comprising external light generated from an external light source and an external object at a first designated frame rate using the image sensor, based on a capturing signal;

identify a frequency of a flicker related to the external light source;

generate first section images for at least a part of a time for which the plurality of image frames are obtained using frames selected from the plurality of image frames to correspond to a second designated frame rate based on the frequency, the second designated frame rate being lower than the first designated frame rate;

generate the first section images based on a designated input not occurring while the plurality of image frames are obtained using frames selected to correspond to the second designated frame rate; and generate second section images having the first designated frame rate based on the designated input occurring for at least a part of the time for which the plurality of image frames are obtained using image frames obtained after the designated input from among the plurality of image frames.

20. An electronic device comprising:
an image sensor;
a memory; and
a processor, wherein the processor is configured to:

obtain a plurality of image frames comprising external light generated from an external light source and an external object at a first designated frame rate using the image sensor, based on a capturing signal;

identify a frequency of a flicker related to the external light source, and a designated input;

generate first section images for at least a part of a time for which the plurality of image frames are obtained using frames selected from a plurality of image frames obtained before the designated input from among the plurality of image frames corresponding to a second designated frame rate based at least on the flicker frequency, the second designated frame rate being lower than the first designated frame rate;

generate second section images for at least a part of the time for which the plurality of image frames are obtained using a plurality of image frames obtained after the designated input from among the plurality of image frames; and generate moving image data comprising at least the first section images and the second section images.

* * * * *